(12) United States Patent
Koshimizu et al.

(10) Patent No.: US 10,668,909 B2
(45) Date of Patent: Jun. 2, 2020

(54) MASTER CYLINDER UNIT

(71) Applicant: Hitachi Automotive Systems, Ltd., Hitachinaka, Ibaraki (JP)

(72) Inventors: Naganori Koshimizu, Kai (JP); Hiroshi Owada, Minami-Alps (JP); Toshiya Oosawa, Yokohama (JP); Ryohei Maruo, Kawasaki (JP)

(73) Assignee: HITACHI AUTOMOTIVE SYSTEMS, LTD., Hitachinaka-shi, Ibaraki (JP)

( * ) Notice: Subject to any disclaimer, the term of this patent is extended or adjusted under 35 U.S.C. 154(b) by 62 days.

(21) Appl. No.: 15/746,436

(22) PCT Filed: Jul. 25, 2016

(86) PCT No.: PCT/JP2016/071713
§ 371 (c)(1),
(2) Date: Jan. 22, 2018

(87) PCT Pub. No.: WO2017/022545
PCT Pub. Date: Feb. 9, 2017

(65) Prior Publication Data
US 2018/0201247 A1    Jul. 19, 2018

(30) Foreign Application Priority Data
Jul. 31, 2015    (JP) ................................. 2015-152774

(51) Int. Cl.
*B60T 8/40* (2006.01)
*B60T 11/34* (2006.01)
(Continued)

(52) U.S. Cl.
CPC ................. *B60T 11/34* (2013.01); *B60T 8/17* (2013.01); *B60T 8/17552* (2013.01);
(Continued)

(58) Field of Classification Search
CPC ...................................................... B60T 8/409
See application file for complete search history.

(56) References Cited

U.S. PATENT DOCUMENTS

| 7,159,696 B2 * | 1/2007 | Kusano | B60T 8/4081 188/152 |
| 2002/0124563 A1 | 9/2002 | Ogiwara et al. | |

(Continued)

FOREIGN PATENT DOCUMENTS

| JP | 2007-176277 A | 7/2007 |
| JP | 2007-536147 A | 12/2007 |

(Continued)

OTHER PUBLICATIONS

International Search Report of PCT/JP2016/071713 dated Sep. 13, 2016.
(Continued)

*Primary Examiner* — F Daniel Lopez
(74) *Attorney, Agent, or Firm* — Mattingly & Malur, PC

(57) ABSTRACT

Provided is a master cylinder unit including a simulator pressure chamber which communicates with a pressure chamber of a master cylinder and moves a simulator piston by means of an introduced fluid pressure; a biasing chamber in which a biasing mechanism biasing the simulator piston against a fluid pressure introduced into the simulator pressure chamber is disposed; a first seal member which partitions a simulator supply chamber, the simulator supply chamber, and the simulator pressure chamber communicating with a master supply chamber; and a second seal member which partitions the simulator supply chamber and the biasing chamber and allows a brake fluid to flow from the simulator supply chamber to the biasing chamber when a pressure difference occurs between the simulator supply chamber and the biasing chamber.

6 Claims, 8 Drawing Sheets

(51) Int. Cl.
*B60T 11/20* (2006.01)
*B60T 17/00* (2006.01)
*B60T 8/17* (2006.01)
*B60T 8/1755* (2006.01)
*B60T 11/236* (2006.01)
*B60T 11/26* (2006.01)
*B60T 13/66* (2006.01)
*B60T 11/22* (2006.01)
*B60T 7/04* (2006.01)
*B60T 7/06* (2006.01)

(52) U.S. Cl.
CPC .............. *B60T 11/20* (2013.01); *B60T 11/236* (2013.01); *B60T 11/26* (2013.01); *B60T 13/66* (2013.01); *B60T 17/00* (2013.01); *B60T 7/042* (2013.01); *B60T 7/06* (2013.01); *B60T 8/409* (2013.01); *B60T 8/4081* (2013.01); *B60T 11/22* (2013.01)

(56) References Cited

U.S. PATENT DOCUMENTS

2008/0284242 A1   11/2008   Ganzel
2013/0232967 A1    9/2013   Murayama et al.
2014/0028084 A1*   1/2014   Biller .................... B60T 8/4081
                                                    303/9.62

FOREIGN PATENT DOCUMENTS

JP    2012-106639 A    6/2012
JP    2014-061817 A    4/2014
KR    2002-0069487 A   9/2002

OTHER PUBLICATIONS

Korean Office Action received in corresponding Korean Application No. 10-2017-7033841 dated Aug. 28, 2019.

* cited by examiner

MASTER CYLINDER UNIT

TECHNICAL FIELD

The present invention relates to a master cylinder unit.

Priority is claimed on Japanese Patent Application No. 2015-152774, filed Jul. 31, 2015, the content of which is incorporated herein by reference.

BACKGROUND ART

There is a braking device which includes a stroke simulator applying a reaction force corresponding to a stepping force of a brake pedal to the brake pedal.

CITATION LIST

Patent Literature

[Patent Literature 1]
Japanese Unexamined Patent Application, First Publication No. 2014-61817

SUMMARY OF INVENTION

Technical Problem

Facilitation of air bleeding work in a braking device is desired.

An object of the present invention is to provide a master cylinder unit which enables facilitation of air bleeding work.

Solution to Problem

An aspect of the present invention includes a master cylinder that generates a fluid pressure in a pressure chamber inside a cylinder in accordance with an operation amount of a brake pedal; a reservoir that stores a brake fluid to be supplied to the pressure chamber; and a stroke simulator that communicates with the pressure chamber, generates a reaction force corresponding to an operation force of the brake pedal, and applies the reaction force to the brake pedal. The master cylinder includes a master piston which moves inside the cylinder in response to an operation of the brake pedal, and a master supply chamber which is connected to the reservoir at all times and communicates with the pressure chamber when the brake pedal is not in operation. The stroke simulator has a simulator piston which moves inside a simulator cylinder, a simulator pressure chamber which communicates with the pressure chamber of the master cylinder on one end side of the simulator piston inside the simulator cylinder and moves the simulator piston by means of an introduced fluid pressure, a biasing chamber in which a biasing mechanism biasing the simulator piston against the introduced fluid pressure is disposed on the other end side of the simulator piston inside the simulator cylinder, a simulator supply chamber which is disposed between the simulator pressure chamber and the biasing chamber on an outer circumferential side of the simulator piston and communicates with the master supply chamber, a first seal member which partitions the simulator supply chamber and the simulator pressure chamber, and a second seal member which partitions the simulator supply chamber and the biasing chamber and allows the brake fluid to flow from the simulator supply chamber to the biasing chamber when a pressure difference occurs between the simulator supply chamber and the biasing chamber.

Advantageous Effects of Invention

According to the master cylinder unit described above, air bleeding work can be facilitated.

DESCRIPTION OF EMBODIMENTS

First Embodiment

Figure 1:
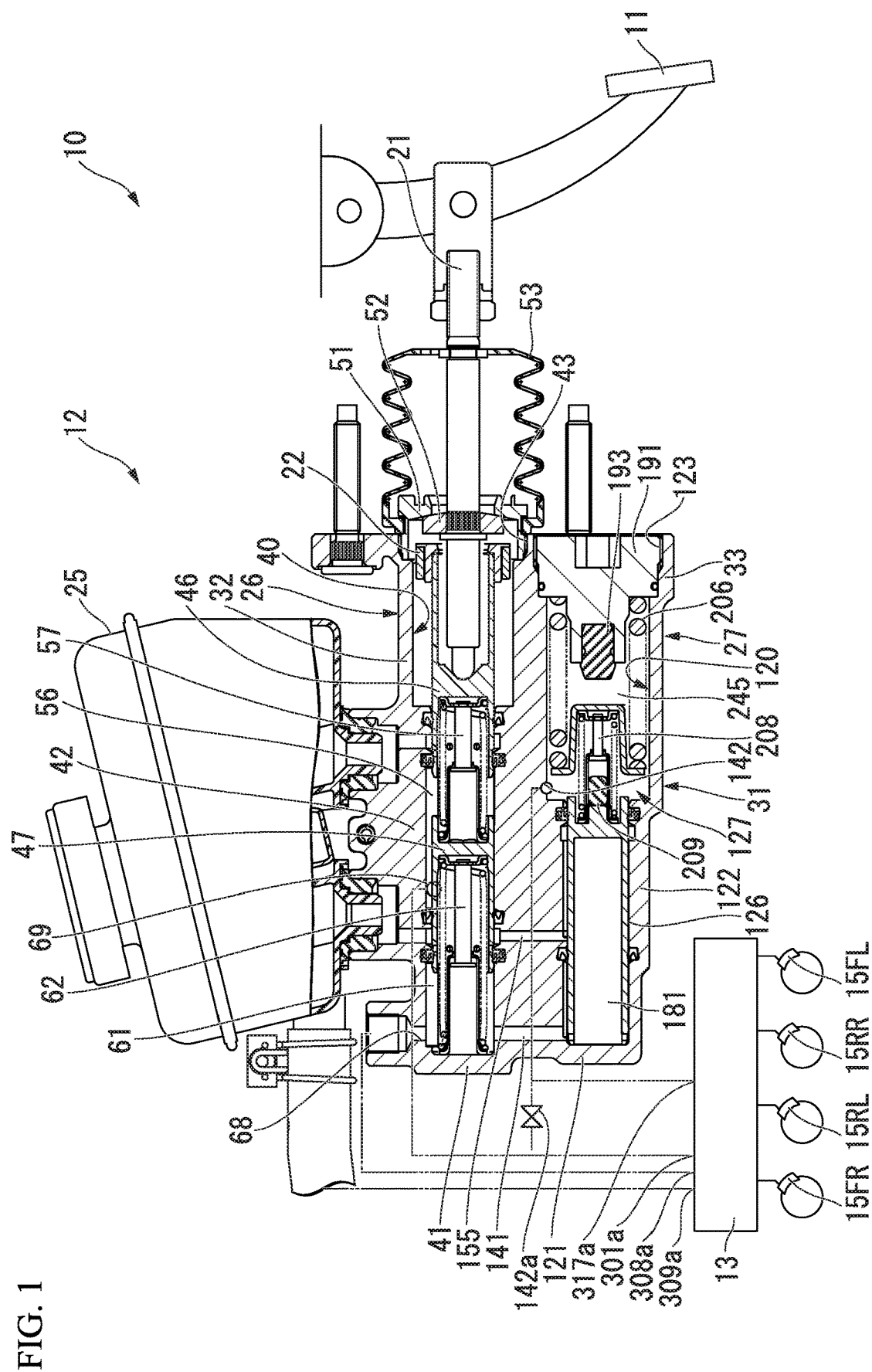
FIG. 1 is a view of a configuration of a braking device including a master cylinder unit of a first embodiment.

A first embodiment will be described below with reference to FIGS. 1 to 6. A braking device 10 illustrated in FIG. 1 is a braking device for a four-wheeled vehicle. The braking device 10 has a brake pedal 11, a master cylinder unit 12, a power module 13, a braking cylinder 15FR, a braking cylinder 15RL, a braking cylinder 15RR, and a braking cylinder 15FL. The braking cylinder 15FR is a front right wheel braking cylinder provided in a wheel on the front right among four wheels. The braking cylinder 15RL is a rear left wheel braking cylinder provided in a wheel on the rear left among the four wheels. The braking cylinder 15RR is a rear right wheel braking cylinder provided in a wheel on the rear right among the four wheels. The braking cylinder 15FL is a front left wheel braking cylinder provided in a wheel on the front left among the four wheels. The braking cylinders 15FR, 15RL, 15RR, and 15FL are fluid pressure actuation mechanisms such as disk brakes and drum brakes applying a brake on rotation of the wheels.

The master cylinder unit 12 has an input rod 21 and a stroke sensor 22. A base end side of the input rod 21 is joined to the brake pedal 11, and the input rod 21 moves in an axial direction in accordance with an operation amount of the brake pedal 11. The stroke sensor 22 detects a movement amount of the input rod 21. The power module 13 generates a brake fluid pressure. Furthermore, the power module 13 controls the brake fluid pressure of each of the braking cylinders 15FR, 15RL, 15RR, and 15FL based on a detection result of the stroke sensor 22 or the like. That is, the braking device 10 is a brake-by-wire-type braking device. Specifically, this braking device 10 is a braking device configuring a sideslip prevention device which prevents a sideslip of a vehicle.

The master cylinder unit 12 includes a reservoir 25, a master cylinder 26, and a stroke simulator 27. The reservoir 25 contains a brake fluid for a brake. The master cylinder 26 can generate a brake fluid pressure corresponding to the operation amount of the brake pedal 11. The master cylinder 26 exchanges the brake fluid with the reservoir 25. The stroke simulator 27 generates a reaction force corresponding to a stepping force, which is an operation force of the brake pedal 11, and applies the reaction force to the brake pedal 11. The reservoir 25 is detachably attached to an upper side of the master cylinder 26 in a vertical direction. The stroke simulator 27 is provided on a lower side of the master cylinder 26 in the vertical direction. The stroke simulator 27 is provided integrally with the master cylinder 26.

Figure 2:
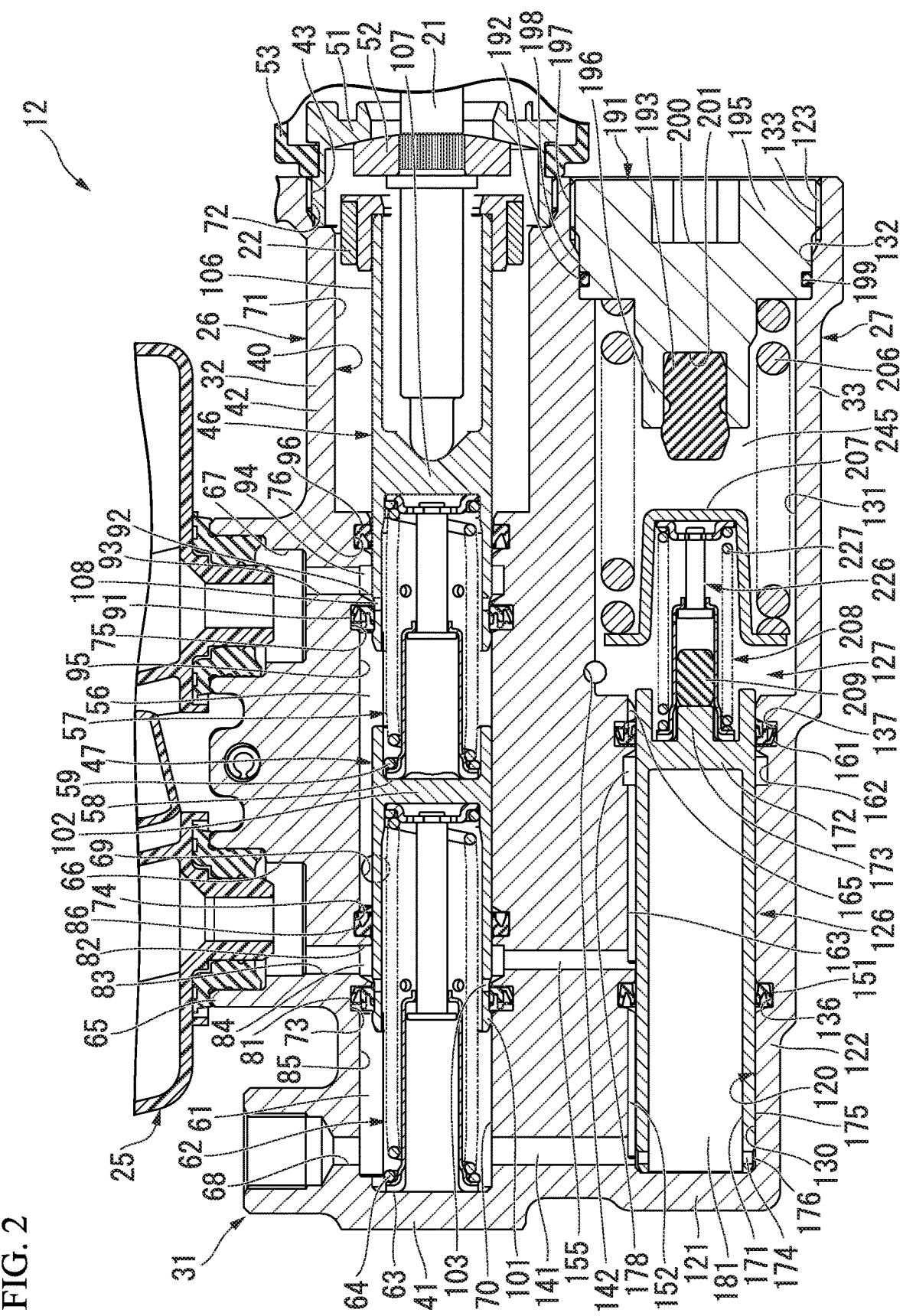
FIG. 2 is a cross-sectional view of the master cylinder unit of the first embodiment.

As illustrated in FIG. 2, the master cylinder unit 12 has a metal cylinder member 31 (cylinder main body) which is processed and formed of one raw material. This cylinder member 31 configures a main body part of the master cylinder unit 12. This cylinder member 31 is shared by the master cylinder 26 and the stroke simulator 27. In the cylinder member 31, an MC cylinder 32 (cylinder) and an SS cylinder 33 (simulator cylinder) are integrally formed in parallel. The MC cylinder 32 configures the master cylinder 26. The SS cylinder 33 configures the stroke simulator 27. That is, the master cylinder 26 and the stroke simulator 27 are disposed in the cylinder member 31 which is integrally formed of one raw material.

A cylinder hole 40 is formed in the MC cylinder 32 of the master cylinder 26. Thus, the MC cylinder 32 has a cylinder bottom portion 41 and a cylinder wall portion 42. The cylinder bottom portion 41 is on a deep side of the cylinder hole 40. The cylinder wall portion 42 has a tubular shape and extends from the cylinder bottom portion 41 to a cylinder opening 43 on a side opposite to the cylinder bottom portion 41.

A primary piston 46 (master piston) is installed on the cylinder opening 43 side in the cylinder wall portion 42 to be movable in the axial direction. The primary piston 46 configures the master cylinder 26 and is made of a metal. In addition, a secondary piston 47 (master piston) is installed on the cylinder bottom portion 41 side of the primary piston 46 inside the cylinder wall portion 42 to be movable in the axial direction. The secondary piston 47 configures the master cylinder 26 and is made of a metal, similar to the primary piston 46. As illustrated in FIG. 1, in the primary piston 46 and the secondary piston 47, the primary piston 46 is disposed on a side closer to the brake pedal 11 than the secondary piston 47. In the primary piston 46 and the secondary piston 47, the secondary piston 47 is disposed on a side opposite to the brake pedal 11 of the primary piston 46.

A tip end portion of the input rod 21 on a side opposite to the brake pedal 11 comes into contact with the primary piston 46. The primary piston 46 receives a stepping force of the brake pedal 11 via the input rod 21. The primary piston 46 moves inside the MC cylinder 32 in response to an operation of the brake pedal 11. The stroke sensor 22 is attached to the primary piston 46. The stroke sensor 22 detects the movement amount of the primary piston 46. Accordingly, the stroke sensor 22 detects the movement amount of the input rod 21 which moves integrally with the primary piston 46. That is, the stroke sensor 22 detects the operation amount of the brake pedal 11.

As illustrated in FIG. 2, a tubular stopper member 51 is screwed into an end portion of the cylinder bottom portion 41 on a side opposite to the cylinder wall portion 42. The input rod 21 is inserted through an inner side of this stopper member 51. A flange member 52 is fixed to an intermediate portion of the input rod 21. The stopper member 51 comes into contact with this flange member 52 from the side opposite to the cylinder bottom portion 41. Accordingly, the stopper member 51 determines a movement limit position for the input rod 21 in a direction opposite to the cylinder bottom portion 41. As illustrated in FIG. 1, an extendable boot 53 covering their gap is interposed between the stopper member 51 and the input rod 21.

A space between the primary piston 46 and the secondary piston 47 inside the MC cylinder 32 of the master cylinder 26 serves as a primary pressure chamber 56 (pressure chamber). A spring unit 57 is provided between the primary piston 46 and the secondary piston 47. The spring unit 57 determines the distance between the primary piston 46 and the secondary piston 47 in a non-braking state having no input from the brake pedal 11. As illustrated in FIG. 2, the spring unit 57 has a retainer 58 and a primary piston spring 59. The retainer 58 is extendable within a predetermined range. The primary piston spring 59 is a coil spring biasing the retainer 58 in an extending direction. The retainer 58 regulates extension of the primary piston spring 59 such that its maximum length does not exceed a predetermined length. The secondary piston 47 which is connected to the primary piston 46 via the spring unit 57 also moves inside the MC cylinder 32 in response to an operation of the brake pedal 11. The master cylinder 26 has the primary piston 46 and the secondary piston 47 as the master pistons which move inside the MC cylinder 32 in response to an operation of the brake pedal 11.

As illustrated in FIG. 1, a space between the secondary piston 47 and the cylinder bottom portion 41 inside the MC cylinder 32 of the master cylinder 26 serves as a secondary pressure chamber 61 (pressure chamber). A spring unit 62 is provided between the secondary piston 47 and the cylinder bottom portion 41. The spring unit 62 determines the distance between the secondary piston 47 and the cylinder bottom portion 41 in a non-braking state having no input from the brake pedal 11. As illustrated in FIG. 2, the spring unit 62 has a retainer 63 and a secondary piston spring 64. The retainer 63 is extendable within a predetermined range. The secondary piston spring 64 is a coil spring biasing the retainer 63 in the extending direction. The retainer 63 regulates extension of the secondary piston spring 64 such that its maximum length does not exceed a predetermined length.

Both the primary piston 46 and the secondary piston 47 have a plunger shape. Thus, the master cylinder 26 is a so-called plunger-type master cylinder. In addition, the master cylinder 26 is a tandem-type master cylinder having two pistons, that is, the primary piston 46 and the secondary piston 47. The present invention is not limited to application to the tandem-type master cylinder. The present invention need only be applied to a plunger-type master cylinder, and can be applied to any plunger-type master cylinder such as a single-type master cylinder in which one piston is disposed in an MC cylinder and a master cylinder having three or more pistons.

An attachment base portion 65 protruding upward in the vertical direction from the cylinder wall portion 42 of the master cylinder 26 is formed integrally with the MC cylinder 32. An attachment hole 66 and an attachment hole 67 for attaching the reservoir 25 are formed in this attachment base portion 65. The attachment hole 66 and the attachment hole 67 are formed such that their positions in a circumferential direction of the cylinder hole 40 coincide with each other. The attachment hole 66 and the attachment hole 67 are formed such that their positions in an axial line direction of the cylinder hole 40 are deviated from each other. The master cylinder unit 12 is disposed in a vehicle such that the axial line direction of the MC cylinder 32 including the cylinder hole 40 of the master cylinder 26 lies along a front/rear direction of the vehicle and the cylinder bottom portion 41 is in a posture toward the front of the vehicle.

In the cylinder wall portion 42 of the master cylinder 26, a secondary discharge path 68 is formed in the vicinity of the cylinder bottom portion 41. The secondary discharge path 68 extends upward from the cylinder hole 40 such that its central axial line is orthogonal to the central axial line of the cylinder hole 40. In addition, a primary discharge path 69 is formed in the cylinder wall portion 42 of the master cylinder 26 on a side closer to the cylinder opening 43 than the secondary discharge path 68. The central axial line of the primary discharge path 69 is parallel to a direction orthogonal to the central axial line of the cylinder hole 40 and extends horizontally in an in-vehicle state. The secondary discharge path 68 and the primary discharge path 69 communicate with the power module 13 as indicated with the two-dot chain line in FIG. 1. The secondary discharge path 68 and the primary discharge path 69 communicate with the braking cylinders 15FR, 15RL, 15RR, and 15FL via the power module 13. The secondary discharge path 68 and the primary discharge path 69 are configured to be capable of discharging the brake fluids of the secondary pressure chamber 61 and the primary pressure chamber 56 toward the braking cylinders 15FR, 15RL, 15RR, and 15FL. The primary pressure chamber 56 and the secondary pressure chamber 61 communicate with the power module 13.

As illustrated in FIG. 2, in order from the cylinder bottom portion 41 side, a sliding inner diameter portion 70, a large inner diameter portion 71, and a female screw portion 72 are formed in an inner circumferential portion of the cylinder wall portion 42. The sliding inner diameter portion 70 has a cylindrical surface-shaped inner diameter surface. The large inner diameter portion 71 has a cylindrical surface-shaped inner diameter surface having a diameter larger than that of the sliding inner diameter portion 70. The female screw portion 72 has a diameter larger than that of the sliding inner diameter portion 70. The central axial lines of the inner diameter surfaces of the sliding inner diameter portion 70 and the large inner diameter portion 71 coincide with each other. These central axial lines are the central axial lines of the cylinder hole 40 and the cylinder wall portion 42.

The stroke sensor 22 fixed to the primary piston 46 is disposed inside the large inner diameter portion 71. The stroke sensor 22 moves in the axial direction of the MC cylinder 32 inside this large inner diameter portion 71. The primary piston 46 and the secondary piston 47 are slidably fitted to the inner diameter surface of the sliding inner diameter portion 70. The primary piston 46 and the secondary piston 47 are guided along this inner diameter surface and move in the axial direction of the MC cylinder 32.

A plurality of circumferential grooves, specifically four grooves, that is, a circumferential groove 73, a circumferential groove 74, a circumferential groove 75, and a circumferential groove 76 are formed in the sliding inner diameter portion 70, in that order from the cylinder bottom portion 41 side. All the circumferential grooves 73 to 76 are formed in annular shapes and all are formed in circular shapes. The circumferential grooves 73 to 76 have a shape recessed radially outward beyond the inner diameter surface of the sliding inner diameter portion 70.

The circumferential groove 73 is on a side closest to the cylinder bottom portion 41 among the circumferential grooves 73 to 76. The circumferential groove 73 is formed in the vicinity of the attachment hole 66 on the cylinder bottom portion 41 side, in the attachment hole 66 and the attachment hole 67. A circular piston seal 81 is disposed inside the circumferential groove 73 to be held in the circumferential groove 73.

An opening groove 82 is formed on the side closer to the cylinder opening 43 than the circumferential groove 73 in the sliding inner diameter portion 70 of the MC cylinder 32. The opening groove 82 is recessed radially outward beyond the inner diameter surface of the sliding inner diameter portion 70 and is formed in an annular shape. This opening groove 82 causes a supply passage 83 to be open inside the cylinder hole 40. The supply passage 83 has a linear shape in which one end is open inside the attachment hole 66 on the cylinder bottom portion 41 side, and the other end is open inside the cylinder hole 40. Here, the positions of the opening groove 82 and the secondary piston 47 in the axial direction overlap each other, and a part surrounded by these serves as a secondary supply chamber 84 (master supply chamber). The secondary supply chamber 84 communicates with the reservoir 25 via the supply passage 83 at all times and is formed in an annular shape. A part of the secondary supply chamber 84 is formed by the secondary piston 47.

An axial groove 85 is formed in an upper portion of the MC cylinder 32 on the side closer to the cylinder bottom portion 41 than the circumferential groove 73 of the sliding inner diameter portion 70. The axial groove 85 is open to the circumferential groove 73 and extends linearly from the circumferential groove 73 toward the cylinder bottom portion 41. The axial groove 85 is recessed radially outward beyond the inner diameter surface of the sliding inner diameter portion 70. The secondary discharge path 68 is formed at a position between the cylinder bottom portion 41 and the circumferential groove 73, that is, in the vicinity of the cylinder bottom portion 41. The axial groove 85 causes the secondary discharge path 68 and the circumferential groove 73 to communicate with each other via the secondary pressure chamber 61 between the secondary piston 47 and the cylinder bottom portion 41.

In the sliding inner diameter portion 70 of the MC cylinder 32, the circumferential groove 74 is formed on a side opposite to the circumferential groove 73 of the opening groove 82, that is, the cylinder opening 43 side. A circular partition seal 86 is disposed inside this circumferential groove 74 to be held in the circumferential groove 74.

In the sliding inner diameter portion 70 of the MC cylinder 32, the circumferential groove 75 is formed in the vicinity of the attachment hole 67 on the cylinder opening 43 side. A circular piston seal 91 is disposed inside this circumferential groove 75 to be held in the circumferential groove 75.

An opening groove 92 is formed on the cylinder opening 43 side of the circumferential groove 75 in the sliding inner diameter portion 70 of the MC cylinder 32. The opening groove 92 is recessed radially outward beyond the inner diameter surface of the sliding inner diameter portion 70 and is formed in an annular shape. This opening groove 92 causes a supply passage 93 to be open inside the cylinder hole 40. The supply passage 93 has a linear shape in which one end is open inside the attachment hole 67 on the cylinder opening 43 side, and the other end is open inside the cylinder hole 40. Here, the positions of the opening groove 92 and the primary piston 46 in the axial direction overlap each other, and a part surrounded by these serves as a primary supply chamber 94 (master supply chamber). The primary supply chamber 94 communicates with the reservoir 25 via the supply passage 93 at all times and is formed in an annular shape. A part of the primary supply chamber 94 is formed by the primary piston 46. The master cylinder 26 has the secondary supply chamber 84 and the primary supply chamber 94 as master supply chambers which are connected to the reservoir 25 at all times.

An axial groove 95 is formed in an upper portion of the MC cylinder 32 on the side closer to the cylinder bottom portion 41 than the circumferential groove 75 of the sliding inner diameter portion 70. The axial groove 95 is open to the circumferential groove 75 and extends linearly from the circumferential groove 75 toward the cylinder bottom portion 41. The axial groove 95 is open to the circumferential groove 74. The axial groove 95 is recessed radially outward beyond the inner diameter surface of the sliding inner diameter portion 70. The primary discharge path 69 is formed at a position between the circumferential groove 74 and the circumferential groove 75, that is, in the vicinity of the circumferential groove 74. The axial groove 95 causes the primary discharge path 69 and the circumferential groove 75 to communicate with each other via the primary pressure chamber 56 between the primary piston 46 and the secondary piston 47.

In the sliding inner diameter portion 70 of the MC cylinder 32, the circumferential groove 76 is formed on a side opposite to the circumferential groove 75 of the opening groove 92, that is, the cylinder opening 43. A circular partition seal 96 is disposed inside this circumferential groove 76 to be held in the circumferential groove 76.

The secondary piston 47 is disposed on the side closer to the cylinder bottom portion 41 than the primary piston 46 of the MC cylinder 32. The secondary piston 47 has a cylindrical portion 101 and a bottom portion 102 formed at an intermediate position of the cylindrical portion 101 in the axial line direction, and has a plunger shape. The cylindrical portion 101 of the secondary piston 47 is fitted to each of the sliding inner diameter portion 70 of the MC cylinder 32, the piston seal 81 provided in the sliding inner diameter portion 70, and the partition seal 86. The secondary piston 47 is guided by these and slides inside the MC cylinder 32.

A plurality of ports 103 are formed at the end portion of the cylindrical portion 101 on the side closer to the cylinder bottom portion 41. The plurality of ports 103 radially penetrate the cylindrical portion 101. The plurality of ports 103 are formed in the cylindrical portion 101 in a radial manner at positions having equal intervals in the circumferential direction. The spring unit 62 is inserted into the secondary piston 47 of the cylinder bottom portion 41 side of the cylindrical portion 101. In the spring unit 62, one end of the retainer 63 in the axial direction comes into contact with the bottom portion 102 of the secondary piston 47, and the other end of the retainer 63 in the axial direction comes into contact with the cylinder bottom portion 41 of the MC cylinder 32. The secondary piston spring 64 determines the distance between the secondary piston 47 and the cylinder bottom portion 41 in a non-braking state having no input from the input rod 21. The secondary piston spring 64 is reduced in length when there is an input from the input rod 21, and biases the secondary piston 47 to the cylinder opening 43 using a force corresponding to the reduced length.

Here, a part surrounded by the cylinder bottom portion 41, the cylinder bottom portion 41 side of the cylinder wall portion 42, and the secondary piston 47 serves as the secondary pressure chamber 61. The secondary pressure chamber 61 generates a brake fluid pressure in accordance with the operation amount of the brake pedal 11 and supplies the brake fluid pressure to the secondary discharge path 68. In other words, the master cylinder 26 generates a fluid pressure in the secondary pressure chamber 61 inside the MC cylinder 32 in accordance with the operation amount of the brake pedal 11. This secondary pressure chamber 61 communicates with the secondary supply chamber 84, that is, the reservoir 25, when the secondary piston 47 is at a position in which the ports 103 are open to the opening groove 82. The secondary piston 47 causes the ports 103 to be open to the opening groove 82 when the brake pedal 11 is not in operation. In other words, the secondary supply chamber 84 included in the master cylinder 26 is connected to the reservoir 25 at all times and communicates with the secondary pressure chamber 61 when the brake pedal 11 is not in operation. The reservoir 25 stores a brake fluid to be supplied to the secondary pressure chamber 61 in this manner.

The partition seal 86 held by the circumferential groove 74 of the MC cylinder 32 is an integrally molded product made of synthetic rubber. The partition seal 86 is a cup seal of which the shape on one side of a radial cross-section including its central line is a C-shape. The partition seal 86 is disposed inside the circumferential groove 74 in which a lip part is in a state of being directed toward the cylinder opening 43. In the partition seal 86, the inner circumference is in slide contact with an outer circumferential surface of the secondary piston 47, and the outer circumference comes into contact with the circumferential groove 74 of the MC cylinder 32. Accordingly, the partition seal 86 seals the gap at the position of the partition seal 86 of the secondary piston 47 and the MC cylinder 32 at all times.

The piston seal 81 held by the circumferential groove 73 of the MC cylinder 32 is an integrally molded product made of synthetic rubber such as EPDM. The piston seal 81 is a cup seal of which the shape on one side of a radial cross-section including its central line is an E-shape. The piston seal 81 is disposed inside the circumferential groove 73 in which a lip part is in a state of being directed toward the cylinder bottom portion 41. In the piston seal 81, the inner circumference is in slide contact with the outer circumferential surface of the secondary piston 47, and the outer circumference comes into contact with the circumferential groove 73 of the MC cylinder 32. Accordingly, the piston seal 81 can seal the gap at the position of the piston seal 81 of the secondary piston 47 and the MC cylinder 32.

The secondary piston 47 is at a non-braking position in which the ports 103 are open to the opening groove 82, when there is no input from the input rod 21. The piston seal 81 partially overlaps the ports 103 in the axial direction when the secondary piston 47 is at a non-braking position as illustrated in FIG. 2. In this state, the secondary pressure chamber 61 and the reservoir 25 communicate with each other via the secondary supply chamber 84 and the ports 103.

In response to an input from the input rod 21, the primary piston 46 moves to the cylinder bottom portion 41 side along its axial direction. Consequently, the secondary piston 47 is pressed by the primary piston 46 via the spring unit 57 and moves to the cylinder bottom portion 41 side along its axial direction. That is, the primary piston 46 linearly moves inside the MC cylinder 32 in response to a stepping force of the brake pedal 11 illustrated in FIG. 1. The secondary piston 47 also linearly moves inside the MC cylinder 32 in response to a stepping force of the brake pedal 11.

In this case, as illustrated in FIG. 2, the secondary piston 47 slides on the inner circumference of the sliding inner diameter portion 70 of the MC cylinder 32, and on the inner circumference of the piston seal 81 and the partition seal 86 held by the MC cylinder 32. When the secondary piston 47 moves to the cylinder bottom portion 41 side, the ports 103 are in a state of being positioned closer to the cylinder bottom portion 41 than the piston seal 81. In this state, the piston seal 81 is in a state of sealing a gap between the reservoir 25 and the secondary supply chamber 84, and the secondary pressure chamber 61. As a result, when the secondary piston 47 further moves toward the cylinder bottom portion 41, the brake fluid inside the secondary pressure chamber 61 is pressurized. The brake fluid pressurized inside the secondary pressure chamber 61 is discharged from the secondary discharge path 68.

When an input from the input rod 21 is reduced from a state in which the brake fluid inside the secondary pressure chamber 61 is pressurized, the secondary piston 47 tends to return to the cylinder opening 43 due to a biasing force of the secondary piston spring 64 of the spring unit 62. The volumetric capacity of the secondary pressure chamber 61 increases due to this movement of the secondary piston 47. In this case, a return of the brake fluid to the secondary pressure chamber 61 via the secondary discharge path 68 sometimes does not follow the increase of the volumetric capacity of the secondary pressure chamber 61 any longer. Consequently, after the fluid pressure of the secondary supply chamber 84, which is the atmospheric pressure, and the fluid pressure of the secondary pressure chamber 61 become equal to each other, and the fluid pressure inside the secondary pressure chamber 61 becomes a negative pressure.

Consequently, due to this negative pressure inside the secondary pressure chamber 61, the piston seal 81 is deformed and a gap is formed between the piston seal 81 and the circumferential groove 73. Accordingly, the brake fluid of the secondary supply chamber 84 passes through this gap and is supplied to the secondary pressure chamber 61. Accordingly, the returning speed of the fluid pressure of the secondary pressure chamber 61 from the negative pressure state to the atmospheric pressure increases. That is, the piston seal 81 is a check valve which allows the brake fluid of the secondary supply chamber 84 to flow to the secondary pressure chamber 61 and regulates the flow of the brake fluid in the opposite direction thereof.

The primary piston 46 is disposed on the side closer to the cylinder opening 43 than the secondary piston 47 of the MC cylinder 32. The primary piston 46 has a cylindrical portion 106 and a bottom portion 107 formed at an intermediate position of the cylindrical portion 106 in the axial line direction, and has a plunger shape. The primary piston 46 is fitted to each of the sliding inner diameter portion 70 of the MC cylinder 32, the piston seal 91 provided in the sliding inner diameter portion 70, and the partition seal 96. The primary piston 46 is guided by these and slides inside the MC cylinder 32. The input rod 21 is inserted into the cylindrical portion 106. The bottom portion 107 is pressed by this input rod 21, and the primary piston 46 moves forward to the cylinder bottom portion 41 side.

A plurality of ports 108 are formed on the cylinder bottom portion 41 side of the cylindrical portion 106. The plurality of ports 108 radially penetrates the cylindrical portion 106. The plurality of ports 108 are formed in the cylindrical portion 106 in a radial manner at positions having equal intervals in the circumferential direction. The spring unit 57 is provided on the secondary piston 47 side of the primary piston 46. The spring unit 57 determines the distance between the primary piston 46 and the secondary piston 47 in a non-braking state having no input from the input rod 21.

In the spring unit 57, the retainer 58 comes into contact with the bottom portion 102 of the secondary piston 47 and the bottom portion 107 of the primary piston 46. The primary piston spring 59 is reduced in length when there is an input from the input rod 21 and the distance between the primary piston 46 and the secondary piston 47 is reduced. The primary piston spring 59 biases the primary piston 46 toward the input rod 21 using a force corresponding to the reduced length.

Here, a part formed by being surrounded by the cylinder wall portion 42, the primary piston 46, and the secondary piston 47 of the MC cylinder 32 serves as the primary pressure chamber 56. The primary pressure chamber 56 generates a brake fluid pressure in accordance with the operation amount of the brake pedal 11 and supplies the brake fluid to the primary discharge path 69. In other words, the master cylinder 26 generates a fluid pressure in the primary pressure chamber 56 inside the MC cylinder 32 in accordance with the operation amount of the brake pedal 11. Moreover, in other words, the primary piston 46 forms the primary pressure chamber 56 for supplying the fluid pressure to the primary discharge path 69, between the secondary piston 47 and the MC cylinder 32. This primary pressure chamber 56 communicates with the primary supply chamber 94, that is, the reservoir 25, when the primary piston 46 is at a position in which the ports 108 are open to the opening groove 92 as illustrated in FIG. 2. The primary piston 46 causes the ports 108 to be open to the opening groove 92 when the brake pedal 11 is not in operation. In other words, the primary supply chamber 94 included in the master cylinder 26 is connected to the reservoir 25 at all times and communicates with the primary pressure chamber 56 when the brake pedal 11 is not in operation. The reservoir 25 stores a brake fluid to be supplied to the primary pressure chamber 56 in this manner.

The partition seal 96 held by the circumferential groove 76 of the MC cylinder 32 is a component in common with the partition seal 86, which is an integrally molded product made of synthetic rubber. The partition seal 96 is a cup seal of which the shape on one side of a radial cross-section including its central line is a C-shape. The partition seal 96 is disposed inside the circumferential groove 76 in which a lip part is in a state of being directed toward the cylinder bottom portion 41. In the partition seal 96, the inner circumference is in slide contact with the outer circumferential surface of the moving primary piston 46, and the outer circumference comes into contact with the circumferential groove 76 of the MC cylinder 32. Accordingly, the partition seal 96 seals the gap at the position of the partition seal 96 of the primary piston 46 and the MC cylinder 32 at all times.

The piston seal 91 held by the circumferential groove 75 of the MC cylinder 32 is a component in common with the piston seal 81, which is an integrally molded product made of synthetic rubber such as EPDM. The piston seal 91 is a cup seal of which the shape on one side of a radial cross-section including its central line is an E-shape. The piston seal 91 is disposed inside the circumferential groove 75 in which a lip part is in a state of being directed toward the cylinder bottom portion 41. In the piston seal 91, the inner circumference is in slide contact with the outer circumferential surface of the primary piston 46, and the outer circumference comes into contact with the circumferential groove 75 of the MC cylinder 32. Accordingly, the piston seal 91 is capable of sealing the gap at the position of the piston seal 91 of the primary piston 46 and the MC cylinder 32.

The primary piston 46 is at a non-braking position in which the ports 108 are open to the opening groove 92, when there is no input from the input rod 21. The piston seal 91 partially overlaps the ports 108 of the primary piston 46 in the axial direction when the primary piston 46 is at a non-braking position. In this state, the primary pressure chamber 56 and the reservoir 25 communicate with each other via the primary supply chamber 94 and the ports 108.

In response to an input from the input rod 21, the primary piston 46 moves toward the cylinder bottom portion 41 along its axial direction. In this case, the primary piston 46 slides on the inner circumference of the sliding inner diameter portion 70 of the MC cylinder 32, and on the inner circumferences of the piston seal 91 and the partition seal 96 held by the MC cylinder 32. When the primary piston 46 moves toward the cylinder bottom portion 41, the ports 108 are in a state of being positioned closer to the cylinder bottom portion 41 than the piston seal 91. In this state, the piston seal 91 is in a state of sealing a gap between the reservoir 25 and the primary supply chamber 94, and the primary pressure chamber 56. Accordingly, when the primary piston 46 further moves toward the cylinder bottom portion 41, the brake fluid inside the primary pressure chamber 56 is pressurized. The brake fluid pressurized inside the primary pressure chamber 56 is discharged from the primary discharge path 69.

When an input from the input rod 21 is reduced from a state in which the brake fluid inside the primary pressure chamber 56 is pressurized, the primary piston 46 tends to return to a side opposite to the cylinder bottom portion 41 due to a biasing force of the primary piston spring 59 of the spring unit 57. The volumetric capacity of the primary pressure chamber 56 increases due to this movement of the primary piston 46. In this case, a return of the brake fluid via the primary discharge path 69 sometimes does not follow the increase of the volumetric capacity of the primary pressure chamber 56 any longer. Consequently, after the fluid pressure of the primary supply chamber 94, that is the atmospheric pressure, and the fluid pressure of the primary pressure chamber 56 become equal to each other, and the fluid pressure inside the primary pressure chamber 56 becomes a negative pressure.

Consequently, due to this negative pressure inside the primary pressure chamber 56, the piston seal 91 is deformed and a gap is formed between the piston seal 91 and the circumferential groove 75. Accordingly, the brake fluid of the primary supply chamber 94 passes through this gap and is supplied to the primary pressure chamber 56. Accordingly, the returning speed of the fluid pressure of the primary pressure chamber 56 from the negative pressure state to the atmospheric pressure increases. That is, the piston seal 91 is a check valve which allows the brake fluid of the primary supply chamber 94 to flow to the primary pressure chamber 56 and regulates the flow of the brake fluid in the opposite direction thereof.

A cylinder hole 120 parallel to the cylinder hole 40 of the MC cylinder 32 is formed in the SS cylinder 33 of the stroke simulator 27. Thus, the SS cylinder 33 has a cylinder bottom portion 121 and a cylinder wall portion 122. The cylinder bottom portion 121 is on a deep side in the cylinder hole 120. The cylinder wall portion 122 has a tubular shape and extends from the cylinder bottom portion 121 to a cylinder opening 123 on a side opposite to the cylinder bottom portion 121. The cylinder hole 40 and the cylinder hole 120 are formed on the same side surface side of the cylinder member 31, and the positions of their central axial lines in a horizontal direction coincide with each other. In other words, vertically below the central axial line of the cylinder hole 40, the central axial line of the cylinder hole 120 is disposed in parallel thereto. The position of the cylinder bottom portion 121 of the SS cylinder 33 in the axial direction partially overlaps that of the cylinder bottom portion 41 of the MC cylinder 32. The position of the cylinder opening 123 of the SS cylinder 33 in the axial direction coincides with that of the cylinder opening 43 of the MC cylinder 32.

An SS piston 126 (simulator piston) is movably installed on the side closer to the cylinder bottom portion 121 in the cylinder wall portion 122. The SS piston 126 configures the stroke simulator 27 and is made of a metal. The SS piston 126 moves inside the SS cylinder 33. In addition, a reaction force generating mechanism 127 is provided on the side closer to the cylinder opening 123 than the SS piston 126 inside the cylinder wall portion 122. The reaction force generating mechanism 127 biases the SS piston 126 toward the cylinder bottom portion 121.

In order from the cylinder bottom portion 121 side, a sliding inner diameter portion 130, an intermediate inner diameter portion 131, a large inner diameter portion 132, and a female screw portion 133 are formed in the inner circumferential portion of the cylinder wall portion 122. The sliding inner diameter portion 130 has a cylindrical surface-shaped inner diameter surface. The intermediate inner diameter portion 131 has a cylindrical surface-shaped inner diameter surface having a diameter larger than that of the sliding inner diameter portion 130. In the large inner diameter portion 132, the inner diameter surface has a diameter larger than that of the intermediate inner diameter portion 131. The central axial lines of the inner diameter surfaces of the sliding inner diameter portion 130, the intermediate inner diameter portion 131, and the large inner diameter portion 132 coincide with each other. These central axial lines are the central axial lines of the cylinder hole 120 and the cylinder wall portion 122.

A plurality of circumferential grooves, specifically two grooves, that is, a circumferential groove 136 and a circumferential groove 137 are formed in the sliding inner diameter portion 130, in that order from the cylinder bottom portion 121. Both the circumferential grooves 136 and 137 are formed in annular shapes and both thereof are formed in circular shapes. The circumferential grooves 136 and 137 have a shape recessed radially outward beyond the inner diameter surface of the sliding inner diameter portion 130.

A linear discharge passage 141 is formed at a position in the vicinity of the cylinder bottom portion 121 of the cylinder wall portion 122. The discharge passage 141 extends upward from the cylinder hole 120 and is open inside the secondary pressure chamber 61 of the master cylinder 26. In other words, the discharge passage 141 causes the cylinder hole 40 and the cylinder hole 120 to communicate with each other. Moreover, in other words, the stroke simulator 27 communicates with the secondary pressure chamber 61 of the master cylinder 26 via the discharge passage 141. The central axial line of the discharge passage 141 is orthogonal to the central axial line of the cylinder hole 40 and is orthogonal to the central axial line of the cylinder hole 120. The discharge passage 141 is coaxially formed on the same straight line as the secondary discharge path 68 of the master cylinder 26 while having the same diameter as the secondary discharge path 68. Thus, the secondary discharge path 68 and the discharge passage 141 are formed through hole opening performed once using one drill. The circumferential groove 136 is formed on the side closer to the cylinder opening 123 than the discharge passage 141.

A bleeder passage 142 is formed in the cylinder wall portion 122. The bleeder passage 142 is open to an upper portion of the intermediate inner diameter portion 131 on the side closer to the sliding inner diameter portion 130. The bleeder passage 142 extends to a position on an outer surface of the cylinder member 31. As illustrated in FIG. 1, a bleeder plug 142a for opening and closing the bleeder passage 142 is disposed in this part of the bleeder passage 142. The bleeder plug 142a throws the bleeder passage 142 open to outside air in an opened state and blocks the bleeder passage 142 from outside air in a closed state. As indicated with the two-dot chain line in FIG. 1, the bleeder passage 142 also communicates with the power module 13.

As illustrated in FIG. 2, a circular partition seal 151 (first seal member) is disposed inside the circumferential groove 136 (annular groove) to be held in the circumferential groove 136. The partition seal 151 also configures the stroke simulator 27. The partition seal 151 is provided on the SS cylinder 33 side, in the SS cylinder 33 and the SS piston 126.

An axial groove 152 is formed in an upper portion of the SS cylinder 33 on the side closer to the cylinder bottom portion 121 than the circumferential groove 136 of the sliding inner diameter portion 130. The axial groove 152 is open to the circumferential groove 136 and extends linearly from the circumferential groove 136 toward the cylinder bottom portion 121 side. The axial groove 152 is recessed radially outward beyond the inner diameter surface of the sliding inner diameter portion 130. The axial groove 152 communicates with the discharge passage 141.

A linear communication path 155 is formed on the side closer to the cylinder opening 123 than the circumferential groove 136 in the sliding inner diameter portion 130 of the SS cylinder 33. The communication path 155 extends upward from the cylinder hole 120 and communicates with the opening groove 82 of the MC cylinder 32, that is, the secondary supply chamber 84. The communication path 155 is formed on the same straight line as the supply passage 83 of the master cylinder 26 to have a diameter smaller than that of the supply passage 83. The supply passage 83 and the communication path 155 are formed through hole opening performed once using one stepped-drill. The communication path 155 is orthogonal to the central axial line of the cylinder hole 40 of the MC cylinder 32 and is also orthogonal to the central axial line of the cylinder hole 120 of the SS cylinder 33. That is, the communication path 155 is formed in parallel to the discharge passage 141.

In the sliding inner diameter portion 130 of the SS cylinder 33, the circumferential groove 137 is formed in the vicinity of the end portion on its cylinder opening 123 side. A circular piston seal 161 (second seal member) is disposed inside this circumferential groove 137, which is an annular groove, to be held by the circumferential groove 137. The piston seal 161 also configures the stroke simulator 27. The piston seal 161 is provided on the SS cylinder 33 side, in the SS cylinder 33 and the SS piston 126.

In the partition seal 151 and the piston seal 161, the partition seal 151 is disposed on the front side of the piston seal 161 (forward movement direction side) in a traveling direction of the input rod 21, the primary piston 46, and the secondary piston 47 at the time of stepping on the brake pedal 11. The piston seal 161 is disposed on the rear side of the partition seal 151 (rearward movement direction side) in the traveling direction of the input rod 21, the primary piston 46, and the secondary piston 47 at the time of stepping on the brake pedal 11.

A chamber forming groove 162 is formed on the cylinder bottom portion 121 side of this circumferential groove 137 in the sliding inner diameter portion 130 of the SS cylinder 33. The chamber forming groove 162 is recessed radially outward beyond the inner diameter surface of the sliding inner diameter portion 130 and is formed in an annular shape. An axial groove 163 is formed in an upper portion of the SS cylinder 33 on the side closer to the cylinder bottom portion 41 than the circumferential groove 137 of the sliding inner diameter portion 130. The axial groove 163 has one end open to the circumferential groove 137 and extends linearly from the circumferential groove 137 toward the cylinder bottom portion 41. The axial groove 163 is recessed radially outward beyond the inner diameter surface of the sliding inner diameter portion 130. The axial groove 163 has the other end open to the communication path 155. An axial groove 165 is formed in an upper portion of the SS cylinder 33 on the side closer to the cylinder opening 123 than the circumferential groove 137 of the sliding inner diameter portion 130. The axial groove 165 has one end open to the circumferential groove 137 and extends linearly from the circumferential groove 137 toward the cylinder opening 123. The axial groove 165 is recessed radially outward beyond the inner diameter surface of the sliding inner diameter portion 130.

Figure 3:
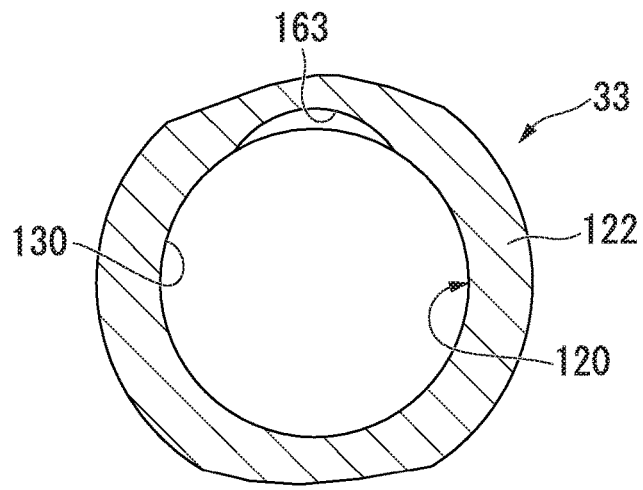
FIG. 3 is a cross-sectional view of an SS cylinder of the master cylinder unit of the first embodiment.

As illustrated in FIG. 3, in the axial groove 163, the shape of a cross section on a surface orthogonal to the central axial line of the sliding inner diameter portion 130 is an arc shape having a diameter smaller than that of the inner diameter surface of the sliding inner diameter portion 130. Similarly, in the axial grooves 152 and 165, the shape of a cross section on a surface orthogonal to the central axial line of the sliding inner diameter portion 130 is an arc shape having a diameter smaller than that of the inner diameter surface of the sliding inner diameter portion 130 (not illustrated). In the axial grooves 85 and 95 of the master cylinder 26, the shape of a cross section on a surface orthogonal to the central axial line of the sliding inner diameter portion 70 is also an arc shape having a diameter smaller than that of the inner diameter surface of the sliding inner diameter portion 70.

The SS piston 126 has a cylindrical portion 171, a bottom portion 172 formed at an intermediate position of the cylindrical portion 171 in the axial direction, and a protrusion portion 173 protruding from the bottom portion 172 in the axial direction. Thus, the SS piston 126 has a plunger shape. The cylindrical portion 171 of the SS piston 126 is fitted to each of the sliding inner diameter portion 130 of the SS cylinder 33, and the partition seal 151 and the piston seal 161 provided in the sliding inner diameter portion 130. The SS piston 126 is guided by these and slides inside the SS cylinder 33. In this case, both the partition seal 151 and the piston seal 161 annularly seal a gap between the inner circumference of the SS cylinder 33 and the outer circumference of the SS piston 126. In the SS piston 126, the bottom portion 172 is formed on the side closer to the cylinder opening 123 than the middle of the cylindrical portion 171 in the axial direction. The protrusion portion 173 protrudes from the bottom portion 172 to the cylinder opening 123.

A small outer diameter portion 176 having an outer diameter smaller than that of a primary outer diameter portion 175 is formed at the end portion of the cylindrical portion 171 on the cylinder bottom portion 121 side. In the cylindrical portion 171, a plurality of ports 174 are formed at positions in this small outer diameter portion 176. The plurality of ports 174 radially penetrate the cylindrical portion 171. The plurality of ports 174 are formed in the cylindrical portion 171 in a radial manner at positions having equal intervals in the circumferential direction.

When the SS piston 126 is in a state of being in contact with the cylinder bottom portion 121, the position of the small outer diameter portion 176 in the axial direction overlaps that of the discharge passage 141. In this state, the SS piston 126 causes the ports 174 to communicate with the discharge passage 141.

A part which is surrounded by the chamber forming groove 162, the axial groove 163, and the SS piston 126 of the SS cylinder 33 and is defined by the partition seal 151 and the piston seal 161 serves as an SS supply chamber 178 (simulator supply chamber). The SS supply chamber 178 also configures the stroke simulator 27. In this SS supply chamber 178, the region surrounded by the chamber forming groove 162 and the SS piston 126 has an annular shape. That is, the SS supply chamber 178 has an annular shape. The communication path 155 causes the secondary supply chamber 84 (one of the primary supply chamber 94 and the secondary supply chamber 84) and the SS supply chamber 178 to communicate with each other. Thus, the communication path 155 causes the SS supply chamber 178 to communicate with the reservoir 25 via the secondary supply chamber 84. The SS supply chamber 178 is disposed on an outer circumferential side of the SS piston 126 and communicates with the secondary supply chamber 84. The communication path 155 causes the reservoir 25, the secondary supply chamber 84, and the SS supply chamber 178 to communicate with each other.

Here, a part surrounded by the cylinder bottom portion 121, the cylinder bottom portion 121 side of the cylinder wall portion 122, and the SS piston 126 serves as an SS pressure chamber 181 (simulator pressure chamber). The SS pressure chamber 181 also configures the stroke simulator 27. The partition seal 151 partitions the SS supply chamber 178 and the SS pressure chamber 181. The SS pressure chamber 181 communicates with the secondary pressure chamber 61 of the master cylinder 26 via the discharge passage 141 at all times. The SS pressure chamber 181 communicates with the secondary pressure chamber 61 of the master cylinder 26 on one end side of the SS piston 126 inside the SS cylinder 33. The SS pressure chamber 181 moves the SS piston 126 by means of an introduced fluid pressure. In contrast, the reaction force generating mechanism 127 biases the SS piston 126 against a fluid pressure introduced into the SS pressure chamber 181 on the other end side of the SS piston 126 inside the SS cylinder 33.

The partition seal 151 held by the circumferential groove 136 of the SS cylinder 33 is an integrally molded product made of synthetic rubber. The partition seal 151 is a cup seal of which the shape on one side of a radial cross-section including its central line is a C-shape. The partition seal 151 is disposed inside the circumferential groove 136 in which a lip part is in a state of being directed toward the cylinder bottom portion 121. In the partition seal 151, the inner circumference is in slide contact with the outer circumferential surface of the SS piston 126, and the outer circumference comes into contact with the circumferential groove 136 of the SS cylinder 33. Accordingly, the partition seal 151 seals the gap at the position of the partition seal 151 of the SS piston 126 and the SS cylinder 33 at all times.

The piston seal 161 held by the circumferential groove 137 of the SS cylinder 33 is an integrally molded product made of synthetic rubber such as EPDM. The piston seal 161 is a cup seal of which the shape on one side of a radial cross-section including its central line is an E-shape. The piston seal 161 is disposed inside the circumferential groove 137 in which a lip part is in a state of being directed toward the cylinder opening 123. In the piston seal 161, the inner circumference is in slide contact with the outer circumferential surface of the SS piston 126, and the outer circumference comes into contact with the circumferential groove 137 of the SS cylinder 33. Accordingly, the piston seal 161 can seal the gap at the position of the piston seal 161 of the SS piston 126 and the SS cylinder 33.

The reaction force generating mechanism 127 has a metal lid member 191, a rubber seal member 192, and a cushioning member 193 (elastic member). The lid member 191 is fitted to the large inner diameter portion 132 of the SS cylinder 33 and is screwed into the female screw portion 133. The seal member 192 is held by the lid member 191 and seals a gap between the lid member 191 and the large inner diameter portion 132 of the SS cylinder 33. The cushioning member 193 is mounted in the lid member 191.

The lid member 191 has a fitting portion 195 and a protrusion portion 196. The fitting portion 195 is fitted to the SS cylinder 33. The protrusion portion 196 has an outer diameter smaller than that of the fitting portion 195 and protrudes from the fitting portion 195 to the cylinder bottom portion 121. A male screw portion 197, a fitting outer diameter portion 198, and a circumferential groove 199 are formed on the outer circumferential side of the fitting portion 195. The male screw portion 197 is screwed into the female screw portion 133. The fitting outer diameter portion 198 is fitted to the large inner diameter portion 132. The circumferential groove 199 is recessed radially inward from the outer diameter surface of the fitting outer diameter portion 198 and has an annular shape. The seal member 192, that is an O-ring, is disposed in the circumferential groove 199. An engagement recess portion 200 is formed in the radial middle of the fitting portion 195. The engagement recess portion 200 is recessed in the axial direction from the end surface on a side opposite to the cylinder bottom portion 121 of the fitting portion 195. A screwing tool such as a hexagonal wrench engages with the engagement recess portion 200 when the male screw portion 197 of the fitting portion 195 is screwed into the female screw portion 133 of the SS cylinder 33.

A recess portion 201 is formed on the cylinder bottom portion 121 side in the radial middle of the protrusion portion 196. The recess portion 201 is recessed on a side opposite to the cylinder bottom portion 121 from a tip end surface on the cylinder bottom portion 121 side of the protrusion portion 196. A columnar cushioning member 193, which is an elastic member, is fitted and fixed in this recess portion 201. When the cushioning member 193 is in a state of being in contact with the bottom surface of the recess portion 201, the cushioning member 193 protrudes to the cylinder bottom portion 121 from the tip end surface of the protrusion portion 196.

The reaction force generating mechanism 127 has a metal spring 206 (biasing mechanism), a metal retainer 207, a metal spring unit 208, and a cushioning member 209 (elastic member). One end of the spring 206 comes into contact with the fitting portion 195 in a state in which the protrusion portion 196 is inserted into the inner side. The retainer 207 comes into contact with the other end of the spring 206. The spring unit 208 is interposed between the retainer 207 and the SS piston 126. The cushioning member 209 is disposed inside the spring unit 208.

Figure 4:
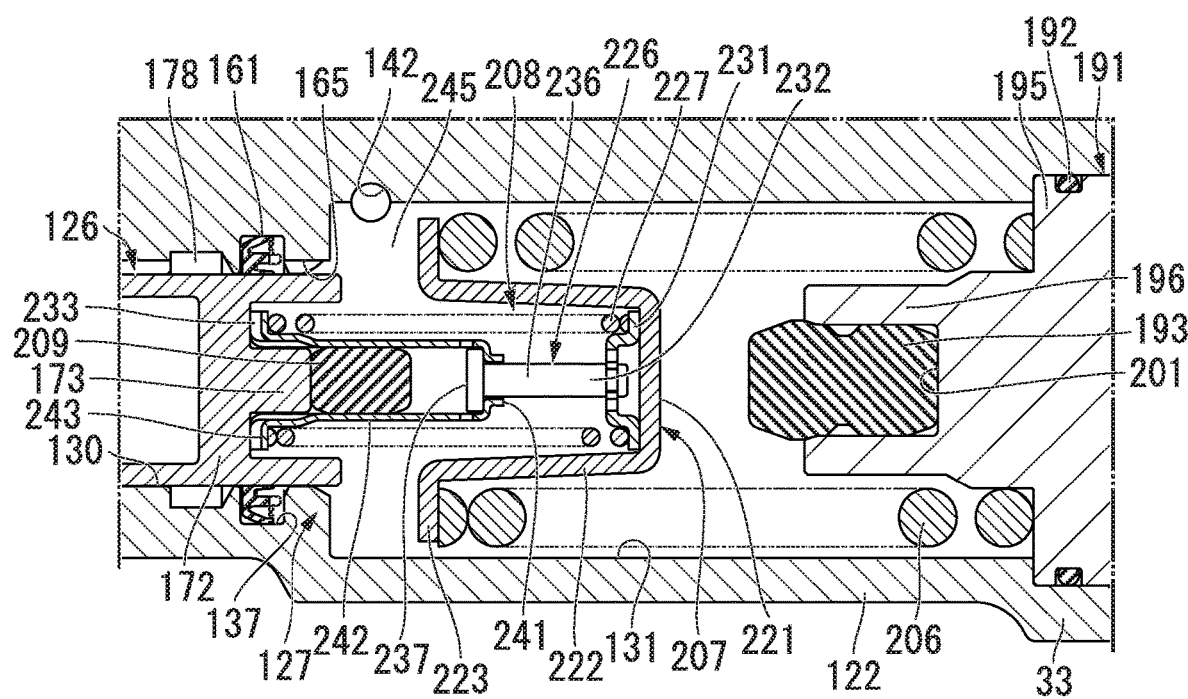
FIG. 4 is a cross-sectional view of a main part of a reaction force generating mechanism of the master cylinder unit of the first embodiment.

As illustrated in FIG. 4, the spring 206 is a biasing mechanism (coil spring) generating a biasing force. The retainer 207 has a lid portion 221, a body portion 222, and a flange portion 223. The lid portion 221 has a disk shape. The body portion 222 extends in the axial direction from an outer circumferential edge portion of the lid portion 221 and has a cylindrical shape. The flange portion 223 extends radially outward beyond the body portion 222 from an end edge portion on a side opposite to the lid portion 221 of the body portion 222 and is formed in a circular shape. In the retainer 207, the flange portion 223 comes into contact with the end portion of the spring 206 and interlocks therewith.

The spring unit 208 has a retainer 226 and a spring 227 (biasing mechanism). The retainer 226 is extendable within a predetermined range. The spring 227 is a biasing mechanism (coil spring) biasing the retainer 226 in the extending direction. The retainer 226 regulates extension of the spring 227 such that its maximum length does not exceed a predetermined length.

The retainer 226 has an interlock member 231, a guide shaft 232, and an interlock member 233. The interlock member 231 has a disk shape, comes into contact with one end of the spring 227, and interlocks therewith. The guide shaft 232 is fixed to the radial middle of the interlock member 231 and extends into the spring 227 from the interlock member 231. The guide shaft 232 has a shaft portion 236 and a flange portion 237. The shaft portion 236 extends from the interlock member 231. The flange portion 237 extends radially outward beyond the shaft portion 236 from the end portion on a side opposite to the interlock member 231 of the shaft portion 236 and is formed in an annular shape.

The interlock member 233 has a slide portion 241, a body portion 242, and a flange portion 243. The slide portion 241 is fitted to the shaft portion 236 of the guide shaft 232 and slides on the shaft portion 236. The body portion 242 extends from the slide portion 241 to a side opposite to the interlock member 231 and has a tubular shape. The flange portion 243 extends radially outward beyond the body portion 242 from the end edge portion on a side opposite to the slide portion 241 of the body portion 242 and is formed in an annular shape. In the interlock member 233, the flange portion 243 comes into contact with the other end of the spring 227 and interlocks therewith. In the retainer 226, the slide portion 241 of the interlock member 233 comes into contact with the flange portion 237 of the guide shaft 232, thereby regulating extension of the spring 227.

In the spring unit 208, the interlock member 231 is inserted into the retainer 207 and comes into contact with the lid portion 221 of the retainer 207. In the spring unit 208, in a state in which the interlock member 233 causes the protrusion portion 173 to be fitted inside the body portion 242, the flange portion 243 is brought into contact with the bottom portion 172 of the SS piston 126. The cushioning member 209 is an elastic member having a cylindrical shape. The cushioning member 209 is accommodated inside the body portion 242 of the interlock member 233 in a state of being disposed between the protrusion portion 173 of the SS piston 126 and the flange portion 237 of the guide shaft 232.

A part surrounded by the SS piston 126, the cylinder wall portion 122 of the SS cylinder 33, and the lid member 191 configures a spring chamber 245 (biasing chamber). The spring chamber 245 also configures the stroke simulator 27. The spring chamber 245 is defined against the SS supply chamber 178 by the piston seal 161. The piston seal 161 partitions the SS supply chamber 178 and the spring chamber 245. In addition, the piston seal 161 is a valve allowing a brake fluid to flow from the SS supply chamber 178 to the spring chamber 245 when a pressure difference occurs between the SS supply chamber 178 and the spring chamber 245. That is, the piston seal 161 is a check valve which causes a brake fluid to flow from the SS supply chamber 178 to the spring chamber 245 and regulates the flow of the brake fluid in the opposite direction thereof when the fluid pressure inside the spring chamber 245 becomes lower than the fluid pressure inside the SS supply chamber 178. One side of the SS supply chamber 178 is defined against the SS pressure chamber 181 by the partition seal 151. The other side of the SS supply chamber 178 is defined against the spring chamber 245 by the piston seal 161. Thus, the SS supply chamber 178 is disposed between the SS pressure chamber 181 and the spring chamber 245.

The cushioning member 193, the spring 206, the retainer 207, the spring unit 208, and the cushioning member 209 of the reaction force generating mechanism 127 are disposed inside the spring chamber 245. Thus, the springs 206 and 227 are disposed in the spring chamber 245. The bleeder passage 142 of the SS cylinder 33 communicates with this spring chamber 245. As illustrated in FIG. 1, the spring chamber 245 communicates with the bleeder plug 142a for opening and closing this spring chamber 245 with respect to outside air. In addition, the spring chamber 245 communicates with the power module 13. In the axial groove 165 of the SS cylinder 33, one end is open inside the circumferential groove 137 and the other end is open to the spring chamber 245.

When the SS piston 126 is in a state of being in contact with the cylinder bottom portion 121 of the SS cylinder 33 as illustrated in FIG. 2, in the spring unit 208 as illustrated in FIG. 4, one end comes into contact with the bottom portion 172 of the SS piston 126 while being reduced in length, and the other end comes into contact with the lid portion 221 of the retainer 207. In addition, in this state, in the spring 206, one end comes into contact with the flange portion 223 of the retainer 207, and the other end comes into contact with the fitting portion 195 of the lid member 191 fixed to the SS cylinder 33. In addition, in this state, the cushioning member 193 is separated from the lid portion 221 of the retainer 207, and the cushioning member 209 is separated from the flange portion 237 of the guide shaft 232 of the spring unit 208. The springs 206 and 227 biases the SS piston 126 in a direction toward the cylinder bottom portion 121 as illustrated in FIG. 2.

The partition seal 151 is provided on the SS cylinder 33 side, in the SS cylinder 33 and the SS piston 126. Furthermore, the partition seal 151 is disposed on a side opposite to the springs 206 and 227 of the piston seal 161 of the SS piston 126. The piston seal 161 is provided on the SS cylinder 33 side, in the SS cylinder 33 and the SS piston 126. Furthermore, the piston seal 161 is disposed on the springs 206 and 227 side of the partition seal 151 of the SS piston 126.

When the primary piston 46 moves to the cylinder bottom portion 41 side in response to an input from the brake pedal 11 illustrated in FIG. 1, the primary piston 46 pressurizes the brake fluid inside the primary pressure chamber 56 as described above. The brake fluid pressurized inside the primary pressure chamber 56 is sent out from the primary discharge path 69 to the power module 13. However, in a normal state, the power module 13 blocks the fluid pressure from the primary discharge path 69.

In addition, when the primary piston 46 of the master cylinder 26 moves to the cylinder bottom portion 41 side in response to an input from the brake pedal 11, the secondary piston 47 is pressed by this primary piston 46 via the spring unit 57 and moves to the cylinder bottom portion 41 side. Consequently, the secondary piston 47 pressurizes the brake fluid inside the secondary pressure chamber 61 as described above. The brake fluid pressurized inside the secondary pressure chamber 61 is sent out from the secondary discharge path 68 to the power module 13. However, in a normal state, the power module 13 blocks the fluid pressure from the secondary discharge path 68. Therefore, the pressurized brake fluid inside the secondary pressure chamber 61 is introduced into the SS pressure chamber 181 of the stroke simulator 27 via the discharge passage 141 and pressurizes the brake fluid inside the SS pressure chamber 181.

Consequently, the SS piston 126 moves in a direction of being separated from the cylinder bottom portion 121, that is, a direction of approaching the lid member 191. Consequently, first, the SS piston 126 causes the spring 227 of the spring unit 208 illustrated in FIG. 4 to be reduced in length against the biasing force thereof. In this case, a reaction force corresponding to the reduced length of the spring 227 illustrated in FIG. 4 is applied to the brake pedal 11 illustrated in FIG. 1. Next, in a state in which the spring 227 remains being reduced in length, the SS piston 126 causes the cushioning member 209 to come into contact with the flange portion 237 of the guide shaft 232 and causes the cushioning member 209 to be reduced in length against the biasing force thereof. In this case, a reaction force corresponding to the reduced length of the spring 227 and the cushioning member 209 illustrated in FIG. 4 is applied to the brake pedal 11 illustrated in FIG. 1. Next, in a state in which the spring 227 and the cushioning member 209 remain being reduced in length, the SS piston 126 causes the spring 206 to be reduced in length against the biasing force thereof. In this case, a reaction force corresponding to the reduced length of the spring 227, the cushioning member 209, and the spring 206 illustrated in FIG. 4 is applied to the brake pedal 11 illustrated in FIG. 1. Next, in a state in which the spring 227, the cushioning member 209, and the spring 206 remain being reduced in length, the SS piston 126 causes the retainer 207 to come into contact with the cushioning member 193 and causes the cushioning member 193 to be reduced in length against the biasing force thereof. In this case, a reaction force corresponding to the reduced length of the spring 227, the cushioning member 209, the spring 206, and the cushioning member 193 illustrated in FIG. 4 is applied to the brake pedal 11 illustrated in FIG. 1. In this manner, the stroke simulator 27 applies a reaction force corresponding to a stepping force of the brake pedal 11 illustrated in FIG. 1 to the brake pedal 11, thereby generating pseudo-operational feeling.

As illustrated in FIG. 2, in the partition seal 151 and the piston seal 161 provided with respect to the SS piston 126, the piston seal 161 is disposed on the front side (forward movement direction side) of the partition seal 151 in the traveling direction of the SS piston 126 at the time of stepping on the brake pedal 11. The partition seal 151 is disposed on the rear side (rearward movement direction side) of the piston seal 161 in the traveling direction of the SS piston 126 at the time of stepping on the brake pedal 11.

Figure 5:
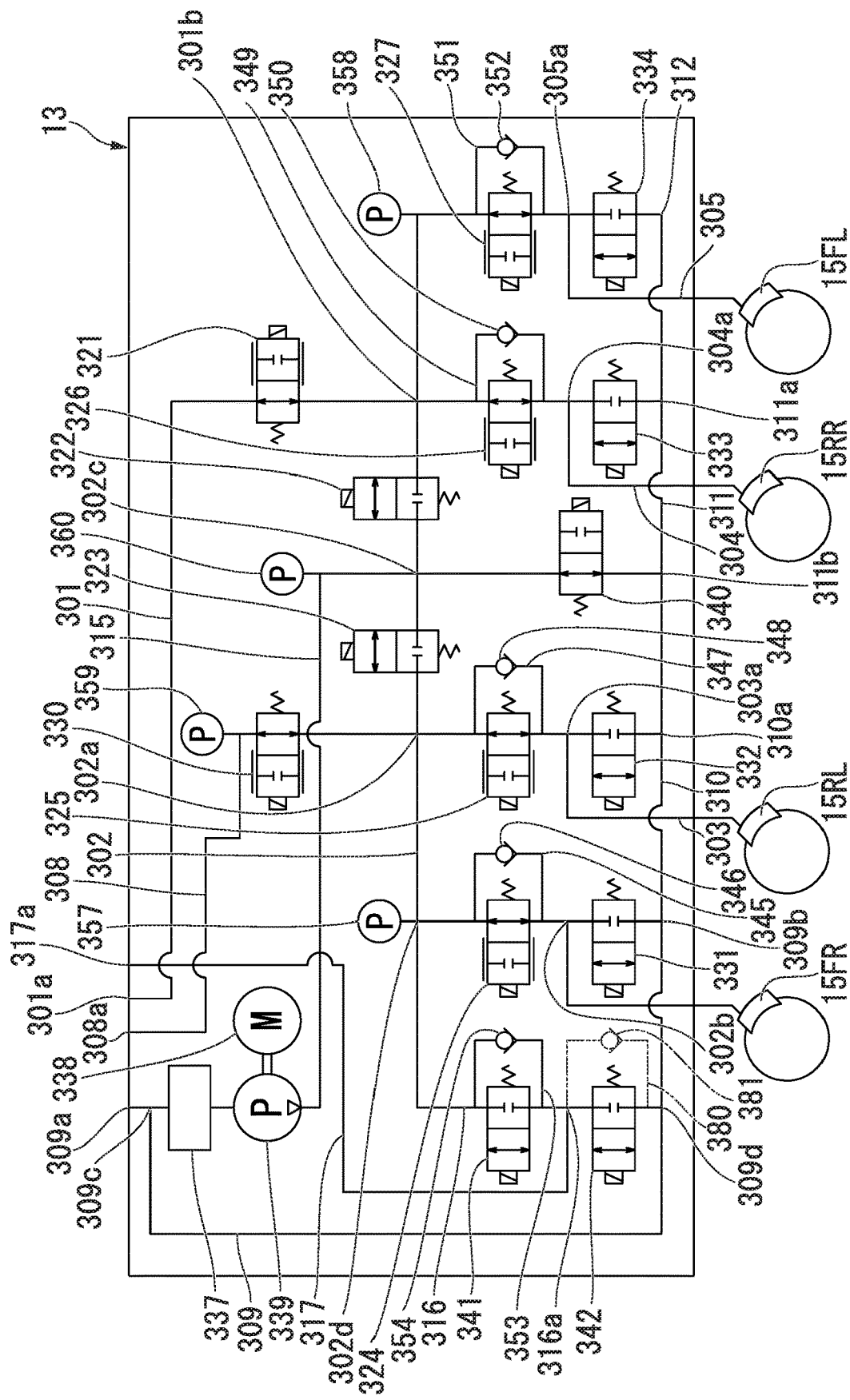
FIG. 5 is a hydraulic circuit diagram of a power module configuring the braking device together with the master cylinder unit of the first embodiment.

As illustrated in FIG. 5, the power module 13 has a passage 301, a passage 302, a passage 303, a passage 304, and a passage 305. The passage 301 communicates with the primary discharge path 69 of the master cylinder 26 illustrated in FIG. 1, through a communication port 301a at an outer end. The passage 302 is branched from a terminal position 301b in the passage 301 and communicates with the braking cylinder 15FR. The passage 303 is branched from a position 302a in the passage 302 and communicates with the braking cylinder 15RL. The passage 304 is branched from the position 301b in the passage 301 and communicates with the braking cylinder 15RR. The passage 305 is branched from the position 301b in the passage 301 and communicates with the braking cylinder 15FL.

In addition, the power module 13 has a passage 308, a passage 309, a passage 310, a passage 311, and a passage 312. The passage 308 communicates with the secondary discharge path 68 of the master cylinder 26 illustrated in FIG. 1, through a communication port 308a at an outer end. As illustrated in FIG. 5, an inner end communicates with the position 302a in the passage 302. The passage 309 is branched from a position 302b in the passage 302 and communicates with the reservoir 25 illustrated in FIG. 1 through a communication port 309a at the outer end. The passage 310 is branched from a position 303a in the passage 303 and communicates with a position 309b in the passage 309. The passage 311 is branched from a position 304a in the passage 304 and communicates with a position 310a in the passage 310. The passage 312 is branched from a position 305a in the passage 305 and communicates with a position 311a in the passage 311.

In addition, the power module 13 has a passage 315, a passage 316, and a passage 317. The passage 315 is branched from a position 309c between the communication port 309a and the position 309b in the passage 309 and communicates with a position 302c between the position 302a and the position 301b in the passage 302. The passage 315 further communicates with a position 311b between the position 311a and the position 310a in the passage 311. The passage 316 is branched from a position 302d between the position 302a and the position 302b in the passage 302 and communicates with a position 309d between the position 309b and the position 309c in the passage 309. The passage 317 is branched from a position 316a in the passage 316 and communicates with the bleeder passage 142 through a communication port 317a at the outer end as illustrated in FIG. 1.

In addition, as illustrated in FIG. 5, the power module 13 has an opening/closing valve 321, an opening/closing valve 322, an opening/closing valve 323, and an opening/closing valve 324. The opening/closing valve 321 is provided at an intermediate position in the passage 301 and opens and closes the passage 301. The opening/closing valve 322 is provided between the position 301b and the position 302c in the passage 302 and opens and closes the passage 302. The opening/closing valve 323 is provided between the position 302a and the position 302c in the passage 302 and opens and closes the passage 302. The opening/closing valve 324 is provided between the position 302b and the position 302d in the passage 302 and opens and closes the passage 302.

In addition, the power module 13 has an opening/closing valve 325, an opening/closing valve 326, and an opening/closing valve 327. The opening/closing valve 325 is provided between the position 302a and the position 303a in the passage 303 and opens and closes the passage 303. The opening/closing valve 326 is provided between the position 301b and the position 304a in the passage 304 and opens and closes the passage 304. The opening/closing valve 327 is provided between the position 301b and the position 305a in the passage 305 and opens and closes the passage 305.

In addition, the power module 13 has an opening/closing valve 330, an opening/closing valve 331, an opening/closing valve 332, an opening/closing valve 333, and an opening/closing valve 334. The opening/closing valve 330 is provided in an intermediate position in the passage 308 and opens and closes the passage 308. The opening/closing valve 331 is provided between the position 302b and the position 309b in the passage 309 and opens and closes the passage 309. The opening/closing valve 332 is provided between the position 303a and the position 310a in the passage 310 and opens and closes the passage 310. The opening/closing valve 333 is provided between the position 304a and the position 311a in the passage 311 and opens and closes the passage 311. The opening/closing valve 334 is provided between the position 305a and the position 311a in the passage 312 and opens and closes the passage 312.

In addition, the power module 13 has a reservoir 337 and a pump 339. The reservoir 337 is provided between the position 309c and the position 302c in the passage 315, communicates with the reservoir 25 of the master cylinder unit 12 illustrated in FIG. 1, and contains the brake fluid. The pump 339 is driven by a motor 338, suctions the brake fluid from the reservoir 337, and discharges the brake fluid toward the position 302c. The pump 339 is provided on the side closer to the position 302c than the reservoir 337.

In addition, the power module 13 has an opening/closing valve 340, an opening/closing valve 341, and an opening/closing valve 342. The opening/closing valve 340 is provided between the position 302c and the position 311b in the passage 315 and opens and closes the passage 315. The opening/closing valve 341 is provided between the position 302d and the position 316a in the passage 316 and opens and closes the passage 316. The opening/closing valve 342 is provided between the position 316a and the position 309d in the passage 316 and opens and closes the passage 316.

Here, the opening/closing valves 321, 324, 325, 326, 327, 330, and 340 are in an opened state as illustrated in FIG. 5 in a non-driven state in which the valves are not electrically driven and are in a closed state in a driven state in which the valves are electrically driven. In addition, the opening/closing valves 322, 323, 331, 332, 333, 334, 341, and 342 are in a closed state as illustrated in FIG. 5 in a non-driven state in which the valves are not electrically driven and are in an opened state in a driven state in which the valves are electrically driven.

The power module 13 has a bypass passage 345, a check valve 346, a bypass passage 347, a check valve 348, a bypass passage 349, and a check valve 350. The bypass passage 345 bypasses the opening/closing valve 324 and connects the position 302b and the position 302d in the passage 302 to each other. The check valve 346 is provided in the bypass passage 345 and allows the brake fluid to flow only from the position 302b to the position 302d side. The bypass passage 347 bypasses the opening/closing valve 325 and connects the position 303a and the position 302a in the passage 303 to each other. The check valve 348 is provided in the bypass passage 347 and allows the brake fluid to flow only from the position 303a to the position 302a side. The bypass passage 349 bypasses the opening/closing valve 326 and connects the position 304a and the position 301b in the passage 304 to each other. The check valve 350 is provided in the bypass passage 349 and allows the brake fluid to flow only from the position 304a to the position 301b side.

In addition, the power module 13 has a bypass passage 351, a check valve 352, a bypass passage 353, and a check valve 354. The bypass passage 351 bypasses the opening/closing valve 327 and connects the position 305a and the position 301b in the passage 305 to each other. The check valve 352 is provided in the bypass passage 351 and allows the brake fluid to flow only from the position 305a to the position 301b side. The bypass passage 353 bypasses the opening/closing valve 341 and connects the position 316a and the position 302d in the passage 316 to each other. The check valve 354 is provided in the bypass passage 353 and allows the brake fluid to flow only from the position 316a to the position 302d side.

In addition, the power module 13 has a pressure sensor 357, a pressure sensor 358, a pressure sensor 359, and a pressure sensor 360. The pressure sensor 357 is connected to the position 302d in the passage 302 and detects the pressure of this part. The pressure sensor 358 is connected to a location between the position 301b in the passage 305, and the opening/closing valve 327 and the non-return valve 352 and detects the pressure of this part. The pressure sensor 359 is connected to a location between the communication port 308a and the opening/closing valve 330 in the passage 308 and detects the pressure of this part. The pressure sensor 360 is connected to a location between the pump 339 and the position 302c in the passage 315 and detects the pressure of this part.

In the braking device 10, when a driver steps on the brake pedal 11 in a normal power supply state, the input rod 21 moves to the cylinder bottom portion 41 side of the master cylinder 26. Consequently, the stroke sensor 22 detects this movement of the input rod 21. In accordance with this detection, the opening/closing valves 321 and 330 of the power module 13 are electrically driven and are in a closed state. The opening/closing valves 322 and 323 are electrically driven and are in an opened state. The opening/closing valve 340 is electrically driven and is in a closed state. Here, at the time of normally stepping on the brake pedal 11, the opening/closing valve 342 is electrically driven and is in an opened state. At the time of suddenly stepping on the brake pedal 11, the opening/closing valve 342 is not electrically driven and is in a closed state.

When the opening/closing valves 321 and 330 are in a closed state as described above, the passage 301 and the passage 308 are closed. Consequently, the opening/closing valves 321 and 330 blocks the brake fluid from being supplied from the secondary discharge path 68 and the primary discharge path 69 of the master cylinder 26 to the braking cylinders 15FR, 15RL, 15RR, and 15FL. Accordingly, when the primary piston 46 and the secondary piston 47 move to the cylinder bottom portion 41 side in accordance with the movement of the input rod 21, the brake fluid of the secondary pressure chamber 61 is introduced into the SS pressure chamber 181 of the stroke simulator 27 via the discharge passage 141. As a result, the fluid pressure of the SS pressure chamber 181 rises so that the SS piston 126 moves in a direction toward the lid member 191. Accordingly, a reaction force corresponding to a stepping force of the brake pedal 11 is applied to the brake pedal 11 by means of the spring 227 of the spring unit 208, the cushioning member 209, the spring 206, and the cushioning member 193, thereby generating pseudo-operational feeling.

In addition, as described above, when the opening/closing valves 322 and 323 are electrically driven and are in an opened state, and when the opening/closing valve 340 are electrically driven and are in a closed state, the pump 339 communicates with the braking cylinders 15FR, 15RL, 15RR, and 15FL. In this case, the pump 339 communicates with the braking cylinders 15FR, 15RL, 15RR, and 15FL via a part from the pump 339 to the position 302c in the passage 315, and the passages 302 to 305. Then, the motor 338 is driven based on the movement amount of the input rod 21, and the like detected by the stroke sensor 22. Consequently, the pump 339 suctions the brake fluid from the reservoir 337 and the reservoir 25 and discharges the brake fluid. The discharged brake fluid is supplied to the braking cylinder 15FR through the passage 315 via the passage 302 between the position 302c and the braking cylinder 15FR. In addition, the discharged brake fluid is supplied to the braking cylinder 15RL through the passage 315 via the passage 302 between the position 302c and the position 302a, and the passage 303. In addition, the discharged brake fluid is supplied to the braking cylinder 15RR through the passage 315 via the passage 302 between the position 302c and the position 301b, and the passage 304. In addition, the discharge brake fluid is supplied to the braking cylinder 15FL through the passage 315 via the passage 302 between the position 302c and the position 301b, and the passage 305. In this manner, the braking cylinders 15FR, 15RL, 15RR, and 15FL are pressurized. Accordingly, a brake is applied to the wheels.

Here, at the time of failure of power supply, the opening/closing valves 321 and 330 of the power module 13 are not electrically driven and are in an opened state. Thus, the opening/closing valves 321 and 330 throw the passage 301 and the passage 308 open. In addition, the opening/closing valves 322, 323, and 341 are in a closed state, the opening/closing valves 324 to 327 are in an opened state, and the opening/closing valves 331 to 334 and 342 are in a closed state. Thus, the brake fluid discharged from the primary pressure chamber 56 of the master cylinder 26 to the passage 301 via the primary discharge path 69 is supplied to each of the braking cylinder 15RR via the passage 304, and the braking cylinder 15FL via the passage 305. In addition, the brake fluid discharged from the secondary pressure chamber 61 of the master cylinder 26 to the passage 308 via the secondary discharge path 68 is supplied to each of the braking cylinder 15FR via the passage 302 between the position 302a and the braking cylinder 15FR, and the braking cylinder 15RL via the passage 303. At the time of returning the pedal, since a passage for connecting the reservoir 25 and the spring chamber 245 to each other is long, the SS piston 126 is unlikely to return due to pipeline resistance. As a result, there is a possibility that pedal feeling deteriorates. However, according to the present embodiment, even in circumstances in which the spring chamber 245 is under a negative pressure, the negative pressure is solved by the piston seal 161. As a result, it is possible to acquire favorable pedal feeling even at the time of returning the pedal.

At the time of air bleeding of the braking device 10, the primary pressure chamber 56 of the master cylinder 26, the secondary pressure chamber 61, and the SS pressure chamber 181 of the stroke simulator 27 are subjected to air bleeding. Since the SS pressure chamber 181 communicates with the secondary pressure chamber 61 via the discharge passage 141, the SS pressure chamber 181 is subjected to air bleeding together with the secondary pressure chamber 61. Next, the spring chamber 245 of the stroke simulator 27 is subjected to air bleeding.

At the time of normal power supply, when the spring chamber 245 is subjected to air bleeding, the primary piston 46 and the secondary piston 47 of the master cylinder 26 are plunged. Consequently, the stroke sensor 22 detects the movement of the input rod 21 as described above. As a result, the opening/closing valves 321 and 330 of the power module 13 are electrically driven and are in a closed state, the opening/closing valves 322 and 323 are electrically driven and are in an opened state, the opening/closing valve 340 is electrically driven and is in a closed state, and the opening/closing valve 342 is electrically driven and is in an opened state. In accordance with the opening/closing valves 321 and 330 which are electrically driven and are in a closed state, when the primary piston 46 and the secondary piston 47 are plunged, the fluid pressure of the secondary pressure chamber 61 rises and the brake fluid is introduced into the SS pressure chamber 181 of the stroke simulator 27 via the discharge passage 141. Consequently, the SS piston 126 moves in a direction of being separated from the cylinder bottom portion 121 while the spring 227 of the reaction force generating mechanism 127, the cushioning member 209, the spring 206, and the cushioning member 193 are reduced in length. At this time, the bleeder plug 142a is opened, the bleeder passage 142 is thrown open to outside air, and air in the spring chamber 245 is discharged via the bleeder passage 142.

Next, the bleeder plug 142a is closed, the bleeder passage 142 is closed, and the plunged state of the primary piston 46 and the secondary piston 47 of the master cylinder 26 is canceled. Consequently, the SS piston 126 moves to the cylinder bottom portion 121 side due to a biasing force of the spring 206 and the spring 227 of the reaction force generating mechanism 127, so that the spring chamber 245 is under a negative pressure. Consequently, since the opening/closing valve 342 is electrically driven and is in an opened state, the brake fluid flows from the reservoir 25 to the bleeder passage 142 via a part between the communication port 309a and the position 309d in the passage 309, a location between the position 309d and the position 316a in the passage 316, and the passage 317, thereby being introduced into the spring chamber 245.

The spring chamber 245 is subjected to air bleeding and the spring chamber 245 is filled with a brake fluid by suitably and repetitively discharging air and introducing a brake fluid as described above.

Figure 6:
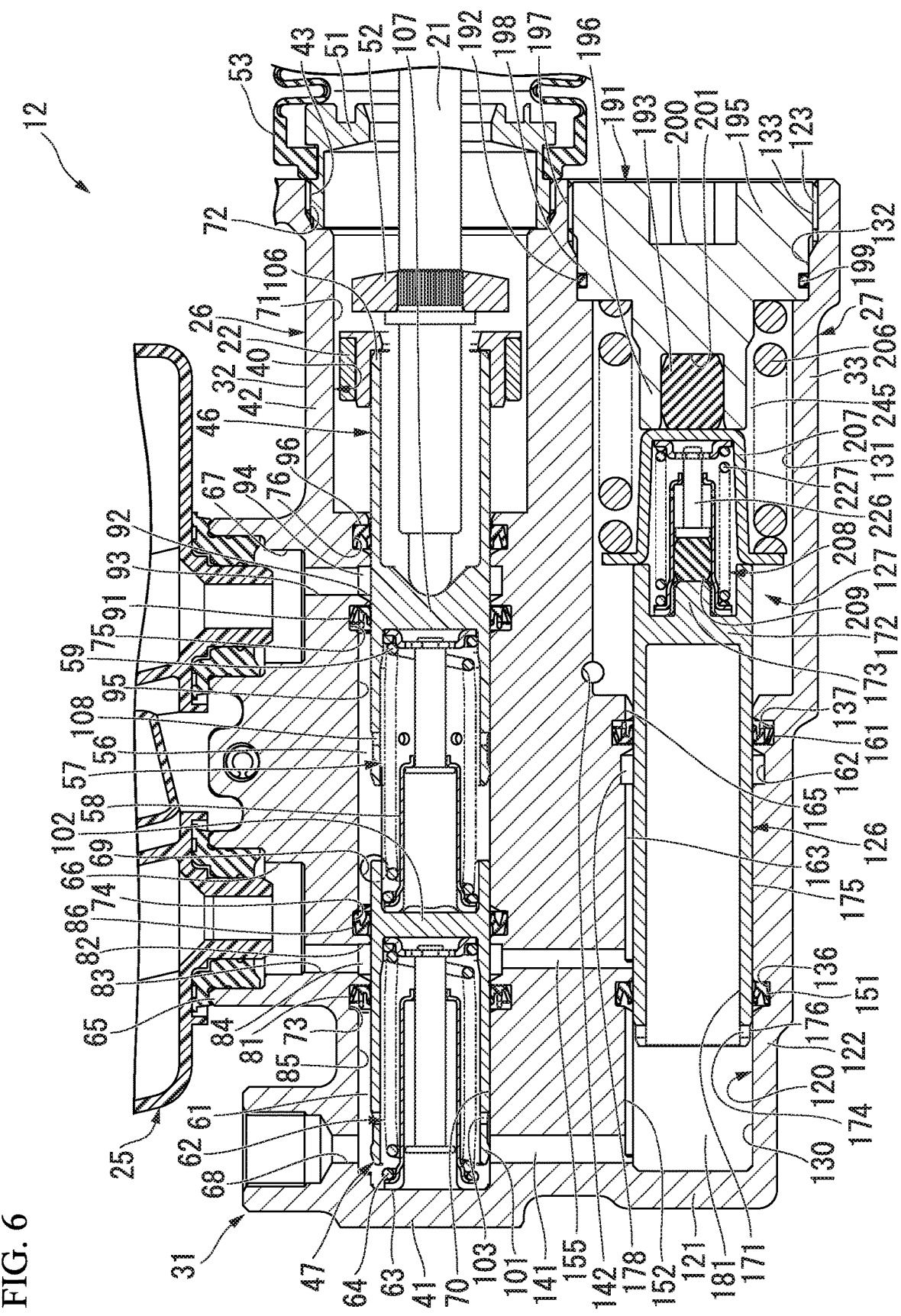
FIG. 6 is a cross-sectional view of the master cylinder unit of the first embodiment.

When the spring chamber 245 is subjected to air bleeding at the time of power down, such as at the time of failure of power supply, the primary piston 46 and the secondary piston 47 of the master cylinder 26 are plunged, as illustrated in FIG. 6. Consequently, the fluid pressure of the secondary pressure chamber 61 rises and the brake fluid is introduced into the SS pressure chamber 181 of the stroke simulator 27 via the discharge passage 141. At this time, if the bleeder plug 142a is opened and the bleeder passage 142 is thrown open to outside air, the SS piston 126 moves in a direction of being separated from the cylinder bottom portion 121 while the spring 227 of the reaction force generating mechanism 127, the cushioning member 209, the spring 206, and the cushioning member 193 are reduced in length. Due to this movement of the SS piston 126, air in the spring chamber 245 is discharged via the bleeder passage 142.

Next, the bleeder plug 142a is closed to close the bleeder passage 142, and the plunged state of the primary piston 46 and the secondary piston 47 of the master cylinder 26 is canceled. Consequently, the SS piston 126 moves to the cylinder bottom portion 121 side due to a biasing force of the spring 206 and the spring 227 of the reaction force generating mechanism 127. Consequently, the inside of the spring chamber 245 is under a negative pressure, and the piston seal 161 is opened due to the pressure difference between the spring chamber 245 and the SS supply chamber 178 under the atmospheric pressure. Accordingly, the brake fluid is introduced into the spring chamber 245 via the reservoir 25, the supply passage 83, the secondary supply chamber 84, the communication path 155, and the SS supply chamber 178. As a more specific flow from the communication path 155, the brake fluid flows to the spring chamber 245 through the communication path 155, the gap between the axial groove 163 and the SS piston 126 configuring the SS supply chamber 178, the gap between the chamber forming groove 162 and the SS piston 126 configuring the SS supply chamber 178, the gap between the piston seal 161 and the circumferential groove 137, and the gap between the axial groove 165 and the SS piston 126.

The spring chamber 245 is subjected to air bleeding and the spring chamber 245 is filled with a brake fluid by suitably and repetitively discharging air and introducing a brake fluid as described above.

The braking device disclosed in Patent Literature 1 includes a stroke simulator which applies a reaction force corresponding to a stepping force of a brake pedal to the brake pedal. In such a braking device, air bleeding of the stroke simulator is particularly troublesome, and facilitation of air bleeding work is desired.

In the first embodiment, the SS supply chamber 178 communicates with the secondary supply chamber 84 which is connected to the reservoir 25 at all times. In addition, the piston seal 161 partitioning the SS supply chamber 178 and the spring chamber 245 allows the brake fluid to flow from the SS supply chamber 178 to the spring chamber 245 when a pressure difference occurs between the SS supply chamber 178 and the spring chamber 245. Thus, the brake fluid can be introduced into the spring chamber 245 from the reservoir 25 via the secondary supply chamber 84 and the SS supply chamber 178 of the master cylinder 26. Therefore, air bleeding work can be facilitated.

In the first embodiment, the partition seal 151 and the piston seal 161, both of which annularly seal a gap between the inner circumference of the SS cylinder 33 and the outer circumference of the SS piston 126, are provided on the SS cylinder 33 of the stroke simulator 27 side. Furthermore, the piston seal 161 is provided to be on the springs 206 and 227 side of the partition seal 151. The annular SS supply chamber 178 is defined by the partition seal 151 and the piston seal 161. In addition, the piston seal 161 defines the spring chamber 245 and the SS supply chamber 178 in which the springs 206 and 227 are disposed. The secondary supply chamber 84, the SS supply chamber 178 of the master cylinder 26, and the reservoir 25 communicate with each other by the communication path 155. The piston seal 161 allows the brake fluid to flow from the SS supply chamber 178 to the spring chamber 245. Accordingly, the brake fluid can be introduced into the spring chamber 245 from the reservoir 25 via the secondary supply chamber 84 of the master cylinder 26, the communication path 155, and the SS supply chamber 178. Therefore, air bleeding work can be facilitated.

Furthermore, since a component only for introducing a brake fluid into the spring chamber 245 is no longer necessary to be provided on the power module 13 side, the cost can be reduced. That is, in order to introduce a brake fluid into the spring chamber 245 when the communication path 155, the SS supply chamber 178, and the piston seal 161 are not provided, for example, it is possible to take the following measures into consideration. The reservoir 25 and the bleeder passage 142 are caused to communicate with each other using a part from the communication port 309a to the position 309d in the passage 309 and the passage 317 of the power module 13, and the brake fluid is introduced into the spring chamber 245 from the reservoir 25. In this case, as indicated with the two-dot chain line in FIG. 5, it is possible to consider that a bypass passage 380 which bypasses the opening/closing valve 342, and a check valve 381 which allows a brake fluid to flow from the communication port 309a to the communication port 317a in the bypass passage 380 are provided. That is, it is possible to consider that the bypass passage 380 and the check valve 381 which allows a brake fluid to flow from the reservoir 25 to the spring chamber 245 are provided. The bypass passage 380 and the check valve 381 required in a case of such a configuration can no longer be required in the first embodiment. Therefore, cost increase can be suppressed.

Here, a general check valve pressing a valve body by means of a spring is opened with a certain degree of a valve opening pressure. Accordingly, if a check valve of such type is used as the check valve 381, when a brake fluid flows to the spring chamber 245, the spring chamber 245 is closed in a state in which a negative pressure corresponding to the valve opening pressure remains in the spring chamber 245. If a negative pressure remains in the spring chamber 245 in this way, air bleeding is hindered. In addition, if a brake fluid flows from the reservoir 25 to the spring chamber 245 via the power module 13 as described above, the length of its passage is also lengthened. As a result, air bleeding work becomes more troublesome. The first embodiment uses the piston seal 161 which is a cup seal having a small valve opening pressure compared thereto. Therefore, it is possible to prevent the negative pressure remaining in the spring chamber 245. In addition, it is possible to remarkably shorten the length of the passage for a brake fluid from the reservoir 25 to the spring chamber 245. Therefore, the volume of the passage can be suppressed. Thus, air bleeding work can be further facilitated. In addition, the SS piston 126 can favorably return to the cylinder bottom portion 121 side by the reaction force generating mechanism 127. Therefore, it is possible to prevent the pedal stroke of the brake pedal 11 from varying.

In addition, in the primary supply chamber 94 and the secondary supply chamber 84 of the master cylinder 26, the communication path 155 causes the secondary supply chamber 84 and the SS supply chamber 178 of the stroke simulator 27 to communicate with each other. Therefore, it is easy to dispose the MC cylinder 32 and the SS cylinder 33 while the positions thereof are aligned in the axial direction. Thus, it is possible to easily shorten the length of the master cylinder unit 12 in the axial direction.

Second Embodiment

Next, a second embodiment will be described mainly based on FIG. 7 focusing on the differences from the first embodiment. Portions in common with those of the first embodiment are expressed using the same names and the same reference signs.

In the second embodiment, an SS piston 126A (simulator piston) partially different from the SS piston 126 of the first embodiment is provided in the stroke simulator 27.

A plurality of relief ports 401 are formed at an end portion of this SS piston 126A on a side opposite to the ports 174 of the cylindrical portion 171. The plurality of relief ports 401 radially penetrate the cylindrical portion 171. The plurality of relief ports 401 are formed in the cylindrical portion 171 in a radial manner at positions having equal intervals in the circumferential direction. In other words, the SS piston 126A includes the relief ports 401 in its part in the outer circumference. The relief ports 401 are formed on a side opposite to the ports 174 of the bottom portion 172 of the SS piston 126A. Thus, the relief ports 401 communicate with the spring chamber 245 at all times.

Figure 7:
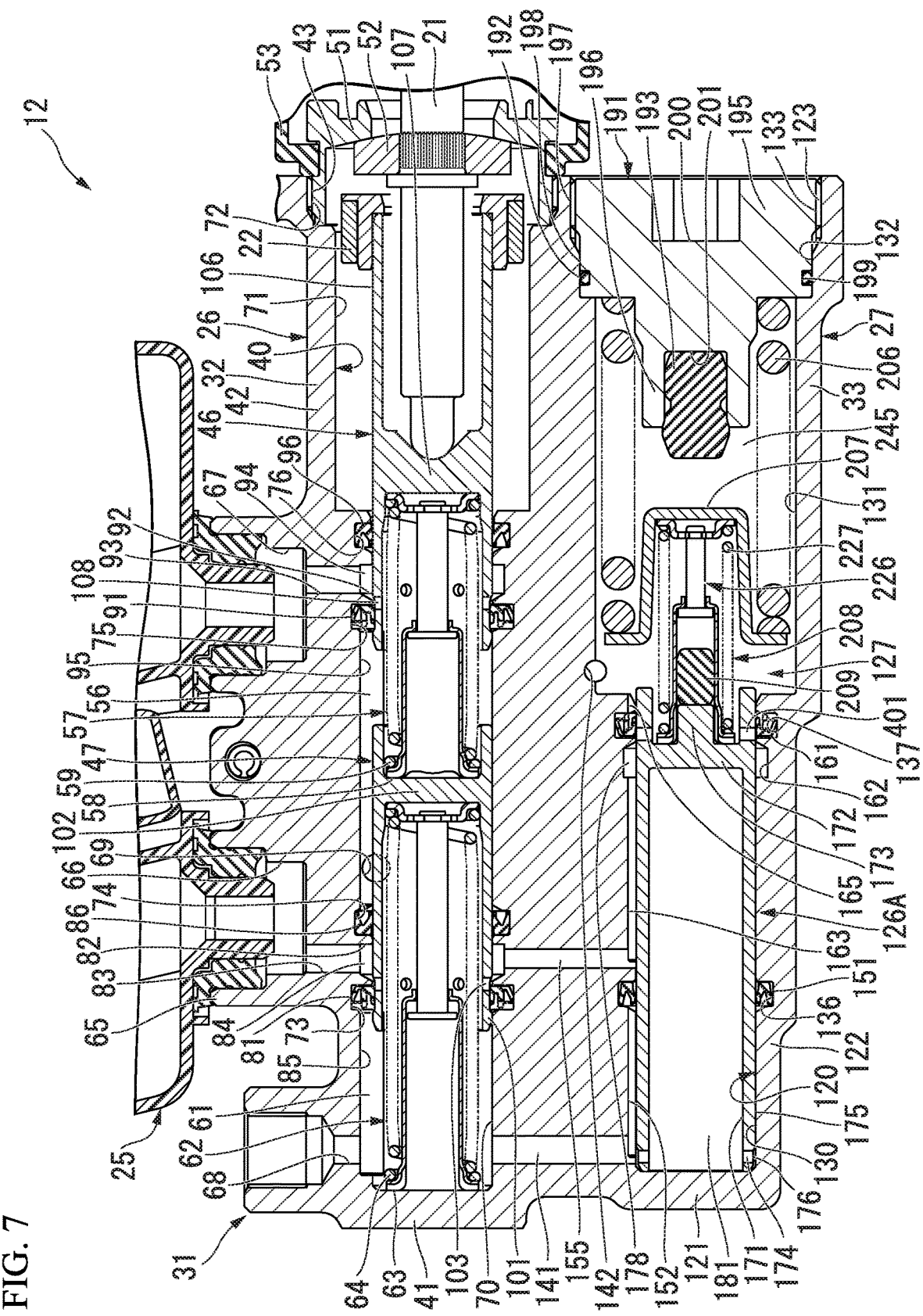
FIG. 7 is a cross-sectional view of a master cylinder unit of a second embodiment.

As illustrated in FIG. 7, the SS piston 126A comes into contact with the cylinder bottom portion 121 of the SS cylinder 33. At this time, the relief ports 401 are disposed radially inward from the piston seal 161 provided in the SS cylinder 33. At this time, the relief ports 401 are positioned closer to the cylinder bottom portion 121 than the piston seal 161, thereby communicating with the SS supply chamber 178. That is, the relief ports 401 cause the SS supply chamber 178 and the spring chamber 245 to communicate with each other. When the SS piston 126A is slightly separated from the cylinder bottom portion 121, the relief ports 401 are shut by the piston seal 161. As a result, the relief ports 401 block communication of the SS supply chamber 178 and the spring chamber 245.

The relief ports 401 cause the SS supply chamber 178 and the spring chamber 245 to communicate with each other in as state in which no fluid pressure is introduced into the SS pressure chamber 181 from the secondary pressure chamber 61. In addition, the relief ports 401 block communication of the SS supply chamber 178 and the spring chamber 245 when a fluid pressure is introduced into the SS pressure chamber 181 from the secondary pressure chamber 61.

In the second embodiment, the relief ports 401 causing the SS supply chamber 178 and the spring chamber 245 to communicate with each other are provided in the SS piston 126A radially inward from the piston seal 161. Therefore, air bleeding work can be further facilitated.

That is, in the first embodiment, when the spring chamber 245 is subjected to air bleeding at the time of power down such as at the time of failure of power supply, a brake fluid flows from the SS supply chamber 178 to the spring chamber 245 via the gap between the piston seal 161 and the circumferential groove 137. At this time, although the piston seal 161 is made of rubber and is opened by a small valve opening pressure, as long as there is a valve opening pressure, a negative pressure corresponding to this valve opening pressure remains in the spring chamber 245. This negative pressure hinders air bleeding. In contrast, in the second embodiment, the relief ports 401 cause the SS supply chamber 178 and the spring chamber 245 to communicate with each other at positions slightly before the SS piston 126A comes into contact with the cylinder bottom portion 121 of the SS cylinder 33. As a result, the spring chamber 245 can be favorably under the atmospheric pressure. Accordingly, air bleeding work can be further facilitated.

Third Embodiment

Figure 8:
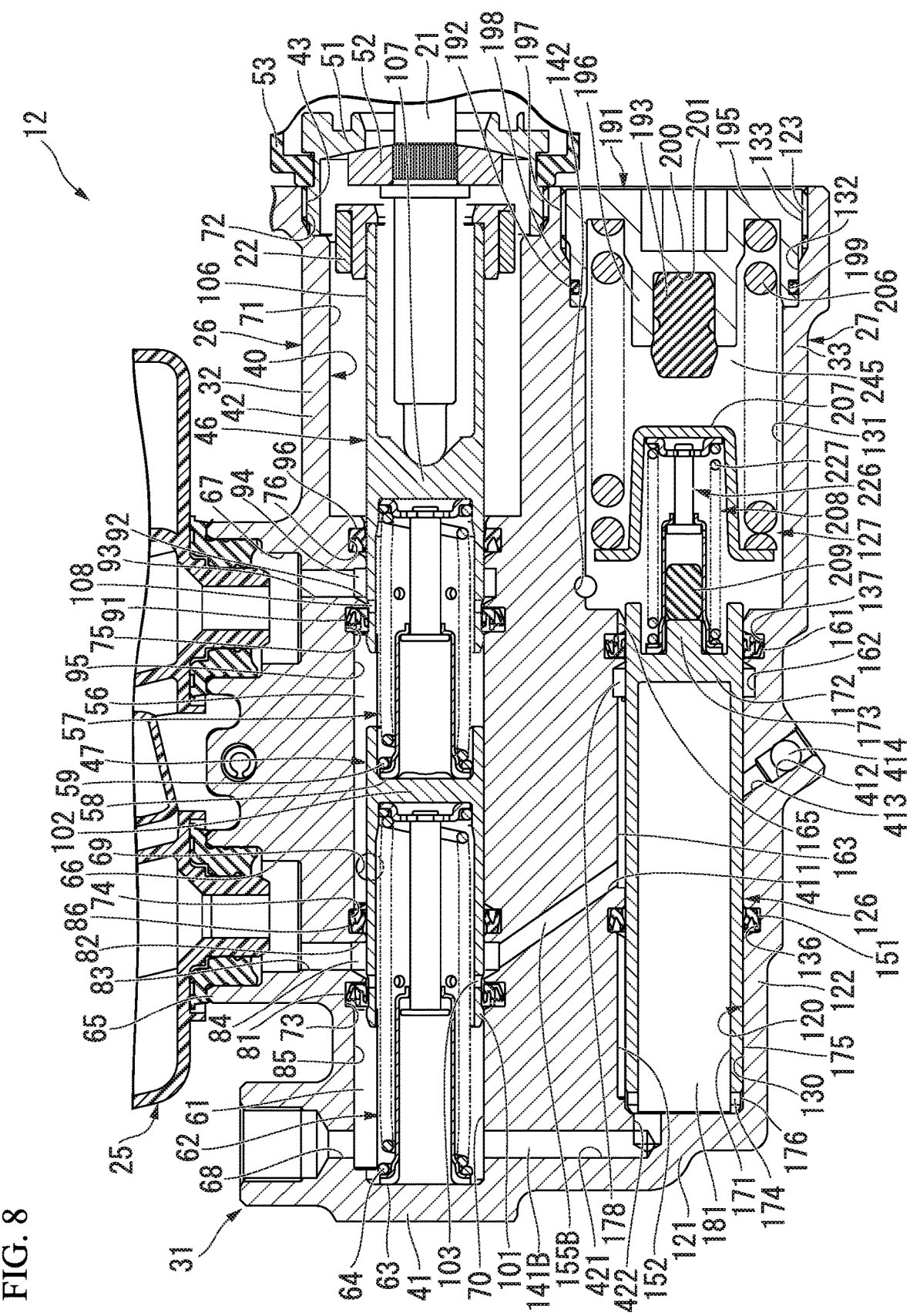
FIG. 8 is a cross-sectional view of a master cylinder unit of a third embodiment.

Next, a third embodiment will be described mainly based on FIG. 8 focusing on the differences from the first embodiment. Portions in common with those of the first embodiment are expressed using the same names and the same reference signs.

In the third embodiment, a communication path 155B partially different from the communication path 155 of the first embodiment is provided in the cylinder member 31.

In the third embodiment, a linear passage hole 411 (hole) is drilled from a lower surface of the cylinder member 31. The secondary supply chamber 84 and the SS supply chamber 178 are coupled to each other through the passage hole 411. This passage hole 411 has a large-diameter hole portion 412 (opening portion) and a small-diameter hole portion 413. The large-diameter hole portion 412 is on a lower side of the cylinder hole 120. The small-diameter hole portion 413 extends to the cylinder hole 40 across the cylinder hole 120. In the passage hole 411, the large-diameter hole portion 412 forms an opening portion of the cylinder member 31 to the outside. The passage hole 411 has a central axial line obliquely intersecting the central axial line of each of the cylinder holes 40 and 120 instead of being orthogonal thereto. In other words, the passage hole 411 is inclined with respect to the central axial line of the cylinder hole 120, that is, the central axial line of the SS cylinder 33. The passage hole 411 is disposed to intersect the SS cylinder 33.

The passage hole 411 is inclined to be positioned on the front side in the traveling direction of the primary piston 46 and the secondary piston 47 at the time of stepping on the brake pedal 11 while being further inclined on the upper side. In other words, the passage hole 411 is inclined to be positioned on the rear side in the traveling direction of the SS piston 126 at the time of stepping on the brake pedal 11 while being further inclined on the upper side. The small-diameter hole portion 413 passes through the position of the end portion of the axial groove 163 of the SS cylinder 33 on the circumferential groove 136 side and extends to the opening groove 82 of the MC cylinder 32.

In regard to hole opening, the large-diameter hole portion 412 and the small-diameter hole portion 413 are formed through hole opening performed once using one stepped-drill. Then, in the passage hole 411, a ball 414 is embedded in the large-diameter hole portion 412 at a lower position in the stroke simulator 27, so that the position of the large-diameter hole portion 412 for the opening portion to the outside of the cylinder member 31 is closed. Accordingly, in the third embodiment, the upper side of the passage hole 411 than the ball 414 configures the communication path 155B. The communication path 155B causes the SS supply chamber 178 of the stroke simulator 27, the secondary supply chamber 84 of the master cylinder 26, and the reservoir 25 to communicate with each other.

The communication path 155B of the third embodiment is inclined with respect to a linear motion direction of the SS piston 126. An end portion of the communication path 155B is shut by the ball 414 at the lower position in the stroke simulator 27. In addition, the communication path 155B of the third embodiment is formed through hole opening performed once using one drill. The communication path 155B includes a part of the passage hole 411 through which a lower outer surface of the SS cylinder 33, the SS supply chamber 178, and the secondary supply chamber 84 of the stroke simulator 27 are linearly coupled to each other.

In addition, in the third embodiment, a discharge passage 141B partially different from the discharge passage 141 of the first embodiment provided in the cylinder member 31.

The third embodiment includes a passage hole 421 and a passage hole 422. The passage hole 421 extends from the cylinder hole 40 toward the cylinder hole 120 while being orthogonal to the central axial line thereof. The passage hole 422 is drilled in the cylinder bottom portion 121 from the upper portion of the cylinder hole 120 to be in parallel to the cylinder hole 120. The passage hole 421 and the passage hole 422 are orthogonal to each other. Accordingly, these passage holes 421 and 422 configure the discharge passage 141B causing the secondary pressure chamber 61 and the SS pressure chamber 181 to communicate with each other. The central axial line of the passage hole 421 is orthogonal to the central axial line of the cylinder hole 40. The central axial line of the passage hole 421 is orthogonal to the central axial line of the cylinder hole 120. The passage hole 421 is formed on the same straight line as the secondary discharge path 68 of the master cylinder 26. The passage hole 421 is formed coaxially with the secondary discharge path 68 while having the same diameter. Thus, the secondary discharge path 68 and the passage hole 421 which configures a part of the discharge passage 141B are formed through hole opening performed once using one drill.

According to the third embodiment, the communication path 155B causing the secondary supply chamber 84 and the SS supply chamber 178 to communicate with each other is inclined with respect to the linear motion direction of the SS piston 126. In addition, the end portion of the communication path 155B is closed by the ball 414 at the lower position of the stroke simulator 27. Therefore, the degree of freedom in layout of the communication path 155B increases.

In addition, the communication path 155B includes a part of the passage hole 411 through which the outer surface of the SS cylinder 33, the SS supply chamber 178, and the secondary supply chamber 84 of the stroke simulator 27 are linearly coupled to each other. Therefore, in regard to hole opening, the communication path 155B can be formed through hole opening performed once using one drill. Therefore, machining is easily performed, so that the machining time can be shortened. Moreover, the partition seal 151 can be disposed close to the cylinder opening 123 side of the SS cylinder 33. Therefore, the SS piston 126 can be reduced in size, so that the cylinder hole 120 can have a shallow depth. Therefore, machining is easily performed, the machining time can be shortened, and the cylinder member 31 can be reduced in size.

Fourth Embodiment

Figure 9:
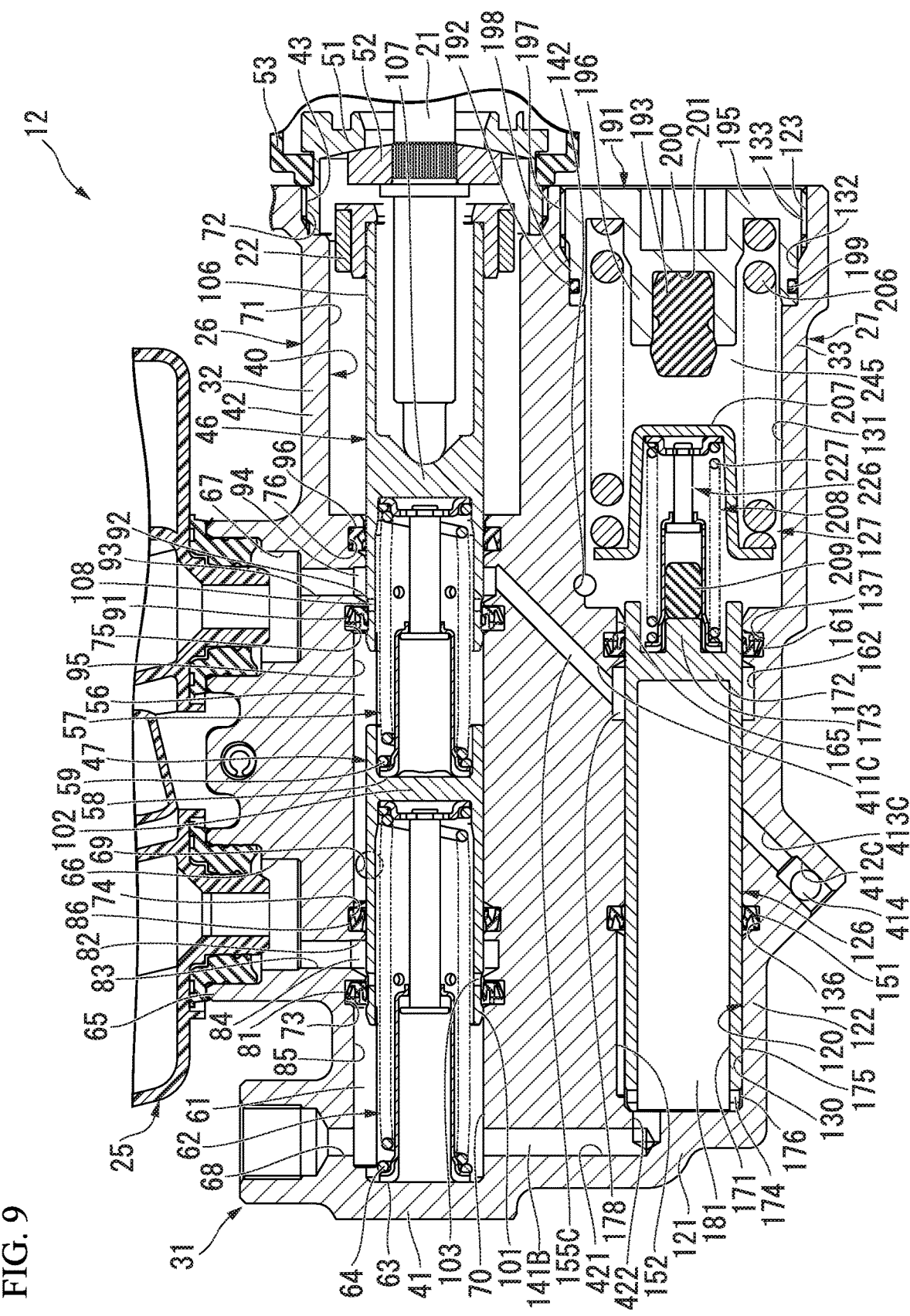
FIG. 9 is a cross-sectional view of a master cylinder unit of a fourth embodiment.

Next, a fourth embodiment will be described mainly based on FIG. 9 focusing on the differences from the third embodiment. Portions in common with those of the third embodiment are expressed using the same names and the same reference signs.

In the fourth embodiment, a communication path 155C partially different from the communication path 155B of the third embodiment is provided in the cylinder member 31.

In the fourth embodiment, a linear passage hole 411C (hole) is drilled from the lower surface of the cylinder member 31. The primary supply chamber 94 and the SS supply chamber 178 are coupled to each other through the passage hole 411C. This passage hole 411C has a large-diameter hole portion 412C (opening portion) and a small-diameter hole portion 413C. The large-diameter hole portion 412C is on a lower side of the cylinder hole 120. The small-diameter hole portion 413C extends to the cylinder hole 40 across the cylinder hole 120. The passage hole 411C has a central axial line obliquely intersecting the central axial line of each of the cylinder holes 40 and 120 instead of being orthogonal thereto.

The passage hole 411C is inclined to be positioned on the rear side in the traveling direction of the primary piston 46 and the secondary piston 47 at the time of stepping on the brake pedal 11 while being further inclined on the upper side. In other words, the passage hole 411C is inclined to be positioned on the front side in the traveling direction of the SS piston 126 at the time of stepping on the brake pedal 11 while being further inclined on the upper side. The small-diameter hole portion 413C passes through the annular chamber forming groove 162 of the SS cylinder 33 and extends to the opening groove 92 of the MC cylinder 32.

The large-diameter hole portion 412C and the small-diameter hole portion 413C are formed through hole opening performed once using one stepped-drill. Then, in the passage hole 411C, the ball 414 is embedded in the large-diameter hole portion 412C at a lower position of the stroke simulator 27, so that the position of the large-diameter hole portion 412C is closed. Accordingly, in the fourth embodiment, the upper side of the ball 414 in the passage hole 411C configures the communication path 155C. The communication path 155C causes the SS supply chamber 178 of the stroke simulator 27 and the primary supply chamber 94 of the master cylinder 26 to communicate with each other.

The communication path 155C of the fourth embodiment is inclined with respect to the linear motion direction of the SS piston 126. In addition, an end portion of the communication path 155C is closed by the ball 414 at the lower position in the stroke simulator 27. In addition, the communication path 155C of the fourth embodiment is formed through hole opening performed once using one drill. The communication path 155C includes a part of the passage hole 411C through which a lower outer surface of the SS cylinder 33, the SS supply chamber 178, and the primary supply chamber 94 of the stroke simulator 27 are linearly coupled to each other.

Here, relief ports 401 similar to those of the second embodiment may be provided in the SS piston 126 of the third and fourth embodiments.

The embodiments described above include a reservoir which contains a brake fluid for a brake, a master cylinder which exchanges the brake fluid with the reservoir, and a stroke simulator which applies a reaction force corresponding to a stepping force of a brake pedal to the brake pedal. The master cylinder includes a master cylinder piston which linearly moves inside a cylinder of the master cylinder in response to a stepping force of the brake pedal, and an annular first supply chamber which is connected to the reservoir at all times. The stroke simulator includes the stroke simulator piston; a spring which biases the stroke simulator piston; a first cup seal which is provided on the cylinder side of the stroke simulator, is disposed on a side opposite to the spring of the stroke simulator piston, and annularly seals a gap between an inner circumference of the cylinder of the stroke simulator and an outer circumference of the stroke simulator piston; a second cup seal which is provided on the cylinder side of the stroke simulator, is disposed on the side close to the spring of the stroke simulator piston, and annularly seals a gap between the inner circumference of the cylinder of the stroke simulator and the outer circumference of the stroke simulator piston; an annular second supply chamber which is defined by the first cup seal and the second cup seal; and a spring chamber which is defined by the second cup seal against the second supply chamber and in which the spring is disposed. The second cup seal is a valve which allows the brake fluid to flow from the second supply chamber to the spring chamber and includes a communication path causing the reservoir, the first supply chamber, and the second supply chamber to communicate with each other. In this manner, the reservoir, the first supply chamber of the master cylinder, and the second supply chamber of the stroke simulator communicate with each other through the communication path. The second cup seal allows the brake fluid to flow from the second supply chamber to the spring chamber. Accordingly, the brake fluid can be introduced into the spring chamber from the reservoir via the first supply chamber of the master cylinder, the communication path, and the second supply chamber of the stroke simulator. Therefore, air bleeding work can be facilitated.

In addition, the master cylinder piston includes a primary piston which is disposed on the brake pedal side, and a secondary piston which is disposed on a side opposite to the brake pedal of the primary piston. The first supply chamber is configured of a primary supply chamber which is partially formed by the primary piston, and a secondary supply chamber which is partially formed by the secondary piston. The communication path causes the secondary supply chamber and the second supply chamber to communicate with each other. In this manner, in the primary supply chamber and the secondary supply chamber, the communication path causes the secondary supply chamber and the second supply chamber to communicate with each other. Therefore, the positions of the cylinder of the master cylinder and the cylinder of the stroke simulator are easily aligned in an axial direction.

In addition, the stroke simulator piston includes a relief port that is a part of the outer circumference of the stroke simulator piston and is provided radially inward from the second cup seal. Therefore, air bleeding work can be further facilitated.

In addition, the communication path is inclined with respect to a linear motion direction of the stroke simulator piston. An end portion of the communication path is closed by a ball at a lower position in the stroke simulator. Therefore, the degree of freedom increases in layout of the communication path.

In addition, the communication path includes a part of a hole through which the outer surface of the cylinder of the stroke simulator, the first supply chamber, and the second supply chamber are linearly coupled to each other. Therefore, in regard to hole opening, the communication path can be formed through hole opening performed once using one drill. Therefore, machining is easily performed, so that the machining time can be shortened.

As a master cylinder unit based on the embodiments described above, for example, it is possible to take the following aspects into consideration.

As a first aspect, a master cylinder unit includes a master cylinder that generates a fluid pressure in a pressure chamber inside a cylinder in accordance with an operation amount of a brake pedal; a reservoir that stores a brake fluid to be supplied to the pressure chamber; and a stroke simulator that communicates with the pressure chamber, generates a reaction force corresponding to an operation force of the brake pedal, and applies the reaction force to the brake pedal. The master cylinder includes a master piston which moves inside the cylinder in response to an operation of the brake pedal, and a master supply chamber which is connected to the reservoir at all times and communicates with the pressure chamber when the brake pedal is not in operation. The stroke simulator has a simulator piston which moves inside a simulator cylinder, a simulator pressure chamber which communicates with the pressure chamber of the master cylinder on one end side of the simulator piston inside the simulator cylinder and moves the simulator piston by means of an introduced fluid pressure, a biasing chamber in which a biasing mechanism biasing the simulator piston against the introduced fluid pressure is disposed on the other end side of the simulator piston inside the simulator cylinder, a simulator supply chamber which is disposed between the simulator pressure chamber and the biasing chamber on an outer circumferential side of the simulator piston and communicates with the master supply chamber, a first seal member which partitions the simulator supply chamber and the simulator pressure chamber, and a second seal member which partitions the simulator supply chamber and the biasing chamber and allows the brake fluid to flow from the simulator supply chamber to the biasing chamber when a pressure difference occurs between the simulator supply chamber and the biasing chamber.

As a second aspect, in the first aspect, the second seal member is a cup seal which is in slide contact with an outer circumference of the simulator piston and is disposed in an annular groove of the simulator cylinder.

As a third aspect, in the first or second aspect, the pressure chamber communicates with a power module which controls a braking cylinder provided in a wheel. The biasing chamber communicates with a bleeder plug for opening and closing the biasing chamber with respect to outside air and communicates with the power module.

As a fourth aspect, in the first to third aspects, a relief port causing the simulator supply chamber and the biasing chamber to communicate with each other in a state in which no fluid pressure from the pressure chamber of the master cylinder is introduced into the simulator pressure chamber and blocking communication between the simulator supply chamber and the biasing chamber when a fluid pressure from the pressure chamber of the master cylinder is introduced into the simulator pressure chamber is formed in the simulator piston.

As a fifth aspect, in any one of the first to fourth aspects, the master cylinder and the stroke simulator are configured to be disposed in a cylinder main body which is integrally formed of one raw material. A communication path through which the reservoir, the master supply chamber, and the simulator supply chamber communicate with each other is formed by a hole which is disposed while being inclined with respect to a central axial line of the simulator cylinder and intersecting the simulator cylinder; and an opening portion of the hole outside the cylinder main body is closed.

As a sixth aspect, in any one of the first to fifth aspect, the master piston includes a primary piston which is disposed on the brake pedal side, and a secondary piston which is disposed on a side opposite to the brake pedal of the primary piston. The master supply chamber is configured of a primary supply chamber which is partially formed by the primary piston, and a secondary supply chamber which is partially formed by the secondary piston. The communication path through which the reservoir, the master supply chamber, and the simulator supply chamber communicate with each other causes the secondary supply chamber and the simulator supply chamber to communicate with each other.

INDUSTRIAL APPLICABILITY

According to the master cylinder unit described above, air bleeding work can be facilitated.

REFERENCE SIGNS LIST

11 Brake pedal
12 Master cylinder unit
13 Power module
25 Reservoir
26 Master cylinder
27 Stroke simulator
31 Cylinder member (cylinder main body)
32 MC cylinder (cylinder)
33 SS cylinder (simulator cylinder)
46 Primary piston (master piston)
47 Secondary piston (master piston)
56 Primary pressure chamber (pressure chamber)
61 Secondary pressure chamber (pressure chamber)
84 Secondary supply chamber (master supply chamber)
94 Primary supply chamber (master supply chamber)
126, 126A SS piston (simulator piston)
142a Bleeder plug
151 Partition seal (first seal member)
155, 155B, 155C Communication path
161 Piston seal (second seal member)
178 SS supply chamber (simulator supply chamber)
181 SS pressure chamber (simulator pressure chamber)
206, 227 Spring (biasing mechanism)
245 Spring chamber (biasing chamber)
401 Relief port
411, 411C Passage hole (hole)
412, 412C Large-diameter hole portion (opening portion)
414 Ball

The invention claimed is:

1. A master cylinder unit comprising:
a master cylinder that generates a fluid pressure in a pressure chamber inside a cylinder in accordance with an operation amount of a brake pedal;
a reservoir that stores a brake fluid to be supplied to the pressure chamber; and
a stroke simulator that communicates with the pressure chamber, generates a reaction force corresponding to an operation force of the brake pedal, and applies the reaction force to the brake pedal,
wherein the master cylinder includes a master piston which moves inside the cylinder in response to an operation of the brake pedal, and a master supply chamber which is connected to the reservoir at all times and communicates with the pressure chamber when the brake pedal is not in operation,
wherein the stroke simulator has a simulator piston which moves inside a simulator cylinder, a simulator pressure chamber which communicates with the pressure chamber of the master cylinder on one end side of the simulator piston inside the simulator cylinder and moves the simulator piston by means of an introduced fluid pressure, a biasing chamber in which a biasing mechanism biasing the simulator piston against the introduced fluid pressure is disposed on the other end side of the simulator piston inside the simulator cylinder, a simulator supply chamber which is disposed between the simulator pressure chamber and the biasing chamber on an outer circumferential side of the simulator piston, a first seal member which partitions the simulator supply chamber and the simulator pressure chamber, and a second seal member which partitions the simulator supply chamber and the biasing chamber and allows the brake fluid to flow from the simulator supply chamber to the biasing chamber when a pressure difference occurs between the simulator supply chamber and the biasing chamber,
wherein the master cylinder and the stroke simulator are configured to be disposed in a cylinder main body which is integrally formed of one raw material, and
wherein a communication path through which the master supply chamber and the simulator supply chamber communicate with each other is formed by a hole having a central axis which is inclined with respect to a central axial line of the simulator cylinder and intersecting the simulator cylinder, and an opening portion of the hole outside the cylinder main body is closed.

2. The master cylinder unit according to claim 1,
wherein the second seal member is a cup seal which is in slide contact with an outer circumference of the simulator piston and is disposed in an annular groove of the simulator cylinder.

3. The master cylinder unit according to claim 1,
wherein the pressure chamber communicates with a power module which controls a braking cylinder provided in a wheel, and
wherein the biasing chamber communicates with a bleeder plug for opening and closing the biasing chamber with respect to outside air and communicates with the power module.

4. The master cylinder unit according to claim 1,
wherein a relief port is formed in the simulator piston, the relief port causing the simulator supply chamber and the biasing chamber to communicate with each other when the simulator piston comes into contact with a bottom of the simulator cylinder, the bottom facing the one end side of the simulator piston, and blocking communication between the simulator supply chamber and the biasing chamber when the simulator piston is separated from the bottom of the simulator cylinder.

5. The master cylinder unit according to claim 1,
wherein the master piston comprises a primary piston which is disposed on the brake pedal side, and a secondary piston which is disposed on a side opposite to the brake pedal of the primary piston,
wherein a primary pressure chamber is provided between the primary piston and the secondary piston, the primary pressure chamber allowing a fluid pressure to generate therein in accordance with an operation amount of the brake pedal,
wherein the pressure chamber is provided between the secondary piston and a bottom of the cylinder, wherein a primary supply chamber is partially formed by the primary piston, the primary supply chamber being connected to the reservoir at all times and communicating with the primary pressure chamber when the brake pedal is not in operation,
wherein the master supply chamber a primary supply is partially formed by the secondary piston.

6. A master cylinder unit comprising:
a master cylinder that generates a fluid pressure in a secondary pressure chamber inside a cylinder in accordance with an operation amount of a brake pedal;
a reservoir that stores a brake fluid to be supplied to the secondary pressure chamber; and
a stroke simulator that communicates with the secondary pressure chamber, generates a reaction force corresponding to an operation force of the brake pedal, and applies the reaction force to the brake pedal,
wherein the master cylinder includes a master piston which moves inside the cylinder in response to an operation of the brake pedal, and a secondary supply chamber which is connected to the reservoir at all times and communicates with the secondary pressure chamber when the brake pedal is not in operation,
wherein the master piston comprises a primary piston which is disposed on the brake pedal side, and a secondary piston which is disposed on a side opposite to the brake pedal of the primary piston,
wherein a primary pressure chamber is provided between the primary piston and the secondary piston, the primary pressure chamber allowing a fluid pressure to generate therein in accordance with an operation amount of the brake pedal,
wherein the secondary pressure chamber is provided between the secondary piston and a bottom of the cylinder,
wherein a primary supply chamber is partially formed by the primary piston, the primary supply chamber being connected to the reservoir at all times and communicating with the primary pressure chamber when the brake pedal is not in operation,
wherein the secondary supply chamber is partially formed by the secondary piston,
wherein the stroke simulator has a simulator piston which moves inside a simulator cylinder, a simulator pressure chamber which communicates with the secondary pressure chamber on one end side of the simulator piston inside the simulator cylinder and moves the simulator piston by means of an introduced fluid pressure, a biasing chamber in which a biasing mechanism biasing the simulator piston against the introduced fluid pressure is disposed on the other end side of the simulator piston inside the simulator cylinder, a simulator supply chamber which is disposed between the simulator pressure chamber and the biasing chamber on an outer circumferential side of the simulator piston, a first seal member which partitions the simulator supply chamber and the simulator pressure chamber, and a second seal member which partitions the simulator supply chamber and the biasing chamber and allows the brake fluid to flow from the simulator supply chamber to the biasing chamber when a pressure difference occurs between the simulator supply chamber and the biasing chamber, wherein the master cylinder and the stroke simulator are configured to be disposed in a cylinder main body which is integrally formed of one raw material, and wherein a communication path through which, the primary supply chamber, and the simulator supply chamber communicate with each other is formed by a hole having a central axis which is inclined with respect to a central axial line of the simulator cylinder and intersecting the simulator cylinder, and an opening portion of the hole outside the cylinder main body is closed.

* * * * *